(12) United States Patent
Hofer et al.

(10) Patent No.: US 8,143,788 B2
(45) Date of Patent: Mar. 27, 2012

(54) COMPACT HIGH CURRENT RARE-EARTH EMITTER HOLLOW CATHODE FOR HALL EFFECT THRUSTERS

(75) Inventors: Richard R. Hofer, Monrovia, CA (US); Dan M. Goebel, Tarzana, CA (US); Ronnie M. Watkins, Oro Valley, AZ (US)

(73) Assignee: California Institute of Technology, Pasadena, CA (US)

( * ) Notice: Subject to any disclaimer, the term of this patent is extended or adjusted under 35 U.S.C. 154(b) by 635 days.

(21) Appl. No.: 12/202,252

(22) Filed: Aug. 30, 2008

(65) Prior Publication Data

US 2009/0058305 A1 Mar. 5, 2009

Related U.S. Application Data

(60) Provisional application No. 60/967,094, filed on Aug. 31, 2007.

(51) Int. Cl.
*H01J 17/06* (2006.01)
(52) U.S. Cl. .................................. 313/618; 315/111.81
(58) Field of Classification Search .............. 313/359.1, 313/362.1, 231.01, 231.31, 325, 618; 315/111.21, 315/111.41, 111.81; 250/428, 432 R, 423 R, 250/427
See application file for complete search history.

(56) References Cited

U.S. PATENT DOCUMENTS

| | | | | |
|---|---|---|---|---|
| 4,475,063 A | * | 10/1984 | Aston | 315/111.81 |
| 5,241,243 A | * | 8/1993 | Cirri | 315/111.21 |
| 6,064,156 A | * | 5/2000 | Patterson et al. | 315/111.91 |
| 6,380,685 B2 | * | 4/2002 | Patterson et al. | 315/111.21 |
| 7,667,379 B2 | * | 2/2010 | Kaufman et al. | 313/359.1 |
| 7,791,260 B2 | * | 9/2010 | Gallimore et al. | 313/359.1 |

OTHER PUBLICATIONS

Kim et al., "History of the Hall Thrusters Development in USSR," International Electric Propulsion Conference, IEPC-2007-142, Sep. 2007, Florence Italy, pp. 1-24.
Arhipov et al., "Development and Applicaiton of Electric Thrusters at EDB 'FAKEL'," IEPC-97-004, pp. 28-38.
Arhipov B.A., "Development and Research of Heaterless Cathode-Neutralizer for Linear Hall Thrusters (LHD) and Plasma Ion Thrusters (PIT)," IEPC-97-175, pp. 1061-1068.
Arhipov et al., "The Development Investigation of the Cathode-Compensator of Stationary Plasma Thrusters for Discharge Currents of to 50 A," IEPC-95-230, pp. 1423-1428.
Arhipov et al., "The Development of the Cathodes-Compensators for Stationary Plasma Thrusters (SIT) in USSR," IEPC-91-023, pp. 1-4.

* cited by examiner

*Primary Examiner* — Thuy Vinh Tran
(74) *Attorney, Agent, or Firm* — Canady & Lortz LLP; Bradley K. Lortz

(57) ABSTRACT

An apparatus and method for achieving an efficient central cathode in a Hall effect thruster is disclosed. A hollow insert disposed inside the end of a hollow conductive cathode comprises a rare-earth element and energized to emit electrons from an inner surface. The cathode employs an end opening having an area at least as large as the internal cross sectional area of the rare earth insert to enhance throughput from the cathode end. In addition, the cathode employs a high aspect ratio geometry based on the cathode length to width which mitigates heat transfer from the end. A gas flow through the cathode and insert may be impinged by the emitted electrons to yield a plasma. One or more optional auxiliary gas feeds may also be employed between the cathode and keeper wall and external to the keeper near the outlet.

26 Claims, 12 Drawing Sheets

|  | A | D | φ |
|---|---|---|---|
| BaO-W 411 (Cronin) | 120 | | $1.67 + 2.82 \times 10^{-4}\ T$ |
| Bao-W 411 (Forrester) | | 1.5 | 1.56 |
| LaB$_6$ (Lafferty) | | 29 | 2.66 |
| LaB$_6$ (Jacobson and Storms) | | 110 | 2.87 |
| LaB$_6$ (Storms and Mueller) | 120 | | 2.91 |
| LaB$_6$ (Kohl) | 120 | | $2.66 + 1.23 \times 10^{-4}\ T$ |
| Molybdenum (Kohl) | | 55 | 4.2 |
| Tantalum (Kohl) | | 37 | 4.1 |
| Tungsten (Kohl) | | 70 | 4.55 |

COMPACT HIGH CURRENT RARE-EARTH EMITTER HOLLOW CATHODE FOR HALL EFFECT THRUSTERS

CROSS-REFERENCE TO RELATED APPLICATIONS

This application claims the benefit under 35 U.S.C. §119 (e) of the following U.S. provisional patent application, which is incorporated by reference herein:

U.S. Provisional Patent Application No. 60/967,094, filed Aug. 31, 2007, and entitled "COMPACT, HIGH CURRENT RARE-EARTH EMITTER HOLLOW CATHODE FOR SPACE PROPULSION APPLICATIONS", by Hofer et al.

STATEMENT OF GOVERNMENT RIGHTS

The invention described herein was made in the performance of work under a NASA contract, and is subject to the provisions of Public Law 96-517 (35 U.S.C. 202) in which the Contractor has elected to retain title.

BACKGROUND OF THE INVENTION

1. Field of the Invention

This invention relates to electron emitters for electric propulsion systems. Particularly, this invention relates to electron emitters for Hall effect thrusters in space applications.

2. Description of the Related Art

Electric propulsion systems have been operated in space applications for decades. Electric propulsion systems are well suited for space applications where their low thrust (compared to conventional chemical thrusters) can be tolerated to realize the benefits of their high efficiency. Two basic types of practical electric propulsion systems have been developed, electrostatic ion thrusters and Hall effect thrusters. In general, both types of electric thruster operate by ionizing a gas (i.e., developing a plasma) and accelerating those ions with an electric field. The accelerated ions are ejected in a beam to impart a thrust reaction. Electrostatic ion thrusters develop the accelerating electric field using spaced metal grids whereas Hall effect thrusters develop the electric field near an open end of an annular discharge chamber where the radial component of an applied magnetic field is at its maximum. The intense magnetic field traps electrons and, in order to maintain current continuity, a sharp rise in the electric field is forced to occur that accelerates ions created in this region through ionizing collisions with electrons.

Both electrostatic and Hall effect electric propulsion systems employ electron emitters to develop the plasma and neutralize the ion beam. Present electron emitters for electrostatic and Hall effect electric propulsion systems typically employ a hollow geometry with a barium-oxide impregnated insert that acts as a thermionic electron emitter.

In conventional Hall effect thrusters electron emitter cathodes are mounted external to the annular discharge chamber on one side. As thrust power is increased beyond approximately 5 kW, the ability of the cathode to uniformly distribute electrons around the circumference of the annual thruster chamber in an effective manner diminishes. This can introduce asymmetries in the developed ion beam while also impairing performance and reducing life of the thruster. Accordingly, some Hall effect thrusters employing central cathode configurations have be developed.

Since the 1960s NASA and the commercial aerospace industry have been developing, testing, and flying barium-oxide (Bao) impregnated dispenser cathodes in ion thrusters, Hall thrusters, plasma contactors, and plasma neutralizers. In addition, over 238 Russian Hall thrusters have been flown since 1971 with lanthanum hexaboride ($LaB_6$) hollow cathodes. Further, $LaB_6$ electron emitters have been used extensively in university research devices and industrial applications such as plasma sources, ion sources, arc melters, optical coaters, ion platers, scanning electron microscopes, and many other applications.

Lanthanum hexaboride was first developed as an electron emitter by Lafferty (Lafferty, J. M., "Boride Cathodes," Journal of Applied Physics, Vol. 22, No. 3, March 1951, pp. 299-309) in the 1950s. The thermionic emission of lanthanumboron compounds as a function of the surface stoichiometry was extensively studied by several authors. See, Storms, E., and Mueller, B., "A Study of Surface Stoichiometry and Thermionic Emission Using $LaB_6$, Journal of Applied Physics, Vol. 50, No. 5, May 1979, pp. 3691-3698; Storms, E., and Mueller, B., "Phase Relationship, Vaporization and Thermodynamic Properties of the Lanthanum-Boron System," Journal of Chemical Physics, Vol. 82, No. 1, January 1978, pp. 51-59; Jacobson, D., and Storms, E. K., "Work Function Measurement of Lanthanum-Boron Compounds," IEEE Transactions on Plasma Science, Vol. 6, No. 2, June 1978, pp. 191-199; and Pelletier, J., and Pomot, C., "Work Function of Sintered Lanthanum Hexaboride," Applied Physics Letters, Vol. 34, No. 4, February 1979, pp. 249-251.

The major advantage for using $LaB_6$ cathodes over conventional BaO impregnated dispenser cathodes is the robustness, high-current density and long life exhibited by $LaB_6$ electron emitters. Lanthanum hexaboride cathodes are routinely used with all noble gases from helium to xenon, reactive gases including hydrogen and oxygen, and various other materials including liquid metals such as bismuth. Although not previously employed in space applications in the U.S., the space heritage of lanthanum hexaboride cathodes in Russian thrusters is considerable, and the industrial experience in dealing with the higher operating temperatures and materials compatibility issues is extensive.

The first flight of Russian stationary plasma thruster (SPT) Hall thrusters in 1971, and all subsequent flights, used lanthanum hexaboride cathodes. See, Kim, V., "Electric Propulsion Activity in Russia," IEPC Paper 2001-005, 2001. The first reported use of $LaB_6$ in the U.S. in a hollow cathode was by Goebel et al. in 1978, and the development of a high-current $LaB_6$ cathode for plasma sources that dealt with supporting and making electrical contact with the material was described by Goebel et al. in 1985. See, Goebel, D. M., Crow, J. T., and Forrester, A. T., "Lanthanum Hexaboride Hollow Cathode for Dense Plasma Production," Review of Scientific Instruments, Vol. 49, No. 4, April 1978, pp. 469-472; and Goebel, D. M., Hirooka, Y., and Sketchley, T., "Large Area Lanthanum Hexaboride Electron Emitter," Review of Scientific Instruments, Vol. 56, No. 9, September 1985, pp. 1717-1722. The lanthanum-boron system can comprise combinations of stable $LaB_4$, $LaB_6$, and $LaB_9$ compounds, with the surface color determined by the dominate compound. The evolution of $LaB_4$ to $LaB_9$ compounds is caused either by preferential sputtering of the boron or lanthanum atoms at the near surface by energetic ion bombardment, or by preferential chemical reactions with the surface atoms. Lanthanum-boride compounds, heated to in excess of 1000° C. in vacuum, evaporate their components at a rate that produces a stable $LaB_{6.0}$ surface.

Conventional space hollow cathodes typically use a porous tungsten insert that is impregnated with an emissive mix of barium and calcium oxides and alumina. This configuration is called a dispenser cathode because the tungsten matrix acts as a reservoir for barium that is "dispensed" from the pores to activate the emitter surface. Chemical reactions in the pores or at the surface at high temperature evolve a barium-oxide dipole attached to an active site on the tungsten substrate, which reduces the work function of the surface to about 2.06 eV at temperatures in excess of 1000° C. Because chemistry is involved in the formation of the low work function surface, dispenser cathodes are subject to poisoning that can significantly increase the work function. Care must be taken in handling the inserts and in the vacuum conditions used during operation and storage of these cathodes to avoid poisoning by water vapor and impurities in the gas that can shorten the lifetime or even prevent cathode emission. One of the major drawbacks of using BaO dispenser cathodes in electric propulsion applications is the extremely high feed gas purity presently specified by NASA and commercial thruster manufacturers to avoid these poisoning issues, which has resulted in a special "propulsion-grade" xenon with 99.9995% purity and extensive spacecraft feed system cleaning techniques to be required.

On the other hand, Lanthanum hexaboride is a crystalline material made by press sintering $LaB_6$ powder into rods or plates and then machining the material to the desired shape. Polycrystalline $LaB_6$ cathodes have a work function of about 2.67 eV depending on the surface stoichiometry, and will emit over 10 A/cm$^2$ at a temperature of 1650° C. Because the bulk material is emitting, there is no chemistry involved in producing the low work function surface and thus, $LaB_6$ cathodes are insensitive to impurities and air exposures that would normally destroy a BaO dispenser cathode. In addition, the cathode life is determined primarily by the evaporation rate of the bulk $LaB_6$ material at typical operating temperatures. The higher operating temperature of $LaB_6$ and the need to support and make electrical contact with $LaB_6$ with compatible materials has perhaps unjustly limited their use in the U.S. space program.

Near the lower end of the 5 kW to 10 kW power range in Hall thrusters, where central cathode configurations begin to become more desirable, it is especially challenging to integrate a central cathode due to volume constraints resulting from the inner magnetic circuit of the thruster. These volume limitations stress the design of the central cathode, necessitating miniaturization, which in turn makes achieving an acceptable thermal design more difficult while ensuring sufficient cathode life for a particular application.

In view of the foregoing, there is a need in the art for apparatuses and methods for efficient and effective electron emitters for electric propulsion systems, especially in space applications. In addition, there is a need for such apparatuses and methods to be compact and capable of operating at high current levels. There is also a need for such apparatuses and methods to deal with very high operating temperatures. There is particularly a need for such systems and apparatuses in Hall effect thrusters operating at higher power levels. These and other needs are met by the present invention as detailed hereafter.

SUMMARY OF THE INVENTION

An apparatus and method for achieving an efficient central cathode in a Hall effect thruster is disclosed. A hollow insert disposed inside the end of a hollow conductive cathode comprises a rare-earth element and energized to emit electrons from an inner surface. The cathode employs an end opening having an area at least as large as the internal cross sectional area of the rare earth insert to enhance throughput from the cathode end. In addition, the cathode employs a high aspect ratio geometry based on the cathode length to width which mitigates heat transfer from the end. A gas flow through the cathode and insert may be impinged by the emitted electrons to yield a plasma. One or more optional auxiliary gas feeds may also be employed between the cathode and keeper wall and external to the keeper near the outlet.

A typical embodiment of the invention comprises an electron emitter including a hollow conductive cathode including a cathode orifice in a cathode end having a cathode orifice area smaller than an internal cross sectional cathode area of the hollow conductive cathode, and a hollow rare earth insert disposed within the hollow conductive cathode proximate the cathode end, the hollow rare earth insert having an internal cross sectional insert area no larger than the cathode orifice area of the hollow conductive cathode. Energy is applied to the hollow rare earth insert resulting in electrons emitted from an inner surface of the hollow rare earth insert and a portion of the electrons flow out the cathode end. Typically, the internal cross sectional insert area is substantially identical to the internal cross sectional cathode area. In some embodiments of the invention, the hollow conductive cathode comprises a high aspect ratio geometry between a cathode length and a cathode width of the hollow conductive cathode to reduce heat transfer from the cathode end along the cathode length and to allow central mounting in a Hall effect thruster. Typically, the hollow rare earth insert may comprise lanthanum hexaboride ($LaB_6$).

In operation, a gas flowing through the hollow rare earth insert may be ionized by another portion of the electrons generating a plasma further energizing the inner surface of the hollow rare earth insert to further emit more electrons. In further embodiments of the invention, an external feed may be used delivering supplemental gas external to the hollow conductive cathode proximate to the cathode end to modulate generation of the plasma. A heater is usually disposed around the end of the hollow conductive cathode for heating the rare earth insert to initially energize the rare earth insert to emit the electrons.

In addition, typical embodiments of the invention further employ a hollow conductive keeper including a keeper orifice in a keeper end having a keeper orifice area smaller than an internal cross sectional keeper area of the hollow conductive keeper. In this case, the hollow conductive cathode is disposed within the hollow conductive keeper with the cathode end proximate the keeper end and a voltage is applied between the hollow conductive cathode and the hollow conductive keeper to maintain generation of the plasma. Typically, the keeper orifice is larger than the internal cross sectional insert area. Further, the hollow conductive keeper may comprise graphite, molybdenum, or tantalum. An external feed may be used to deliver supplemental gas external to the hollow conductive keeper proximate to the keeper end to modulate generation of the plasma. In addition, a keeper feed may be used to deliver supplemental gas in an annular passage between the hollow conductive cathode and the hollow conductive keeper to modulate generation of the plasma.

In a similar manner, a typical method embodiment of the invention for emitting electrons comprises providing a hollow conductive cathode including a cathode orifice in a cathode end having a cathode orifice area smaller than an internal cross sectional cathode area of the hollow conductive cathode, disposing a hollow rare earth insert within the hollow conductive cathode proximate the cathode end, the hollow rare earth insert having an internal cross sectional insert area no larger than the cathode orifice area of the hollow conductive cathode, and applying energy to the hollow rare earth insert resulting in electrons emitted from an inner surface of the hollow rare earth insert and a portion of the electrons flow out the cathode end. The method may be further modified in a manner consistent with the apparatus embodiments described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the invention are directed to central cathode electron emitters for Hall effect thrusters. The novel cathode electron emitters employ an insert comprising a rare-earth element to obtain longer life and resistance to poisoning. The cathode employs an end opening having an area at least as large as the internal cross sectional area of the rare earth insert to enhance throughput from the cathode end. In addition, the cathode employs a high aspect ratio geometry based on the cathode length to width which mitigates heat transfer from the end. The compact design for the cathode emitter has the capability of high emission current, e.g., 10 to 60 A.

Although lanthanum hexaboride ($LaB_6$) is the most common rare earth emitter material and has been used for nearly forty years, embodiments of the invention employ a novel design capable of surviving spacecraft launch vibrations and resolves significant heater and material compatibility issues. Embodiments of the invention may also employ alternate rare earth emitters such as cerium hexaboride ($CeB_6$) which may obtain even longer emitter life. In addition, embodiments of the invention may also optionally employ an auxiliary propellant feed that can improve propellant consumption efficiency.

2. Example Central Cathode Electron Emitter in a Hall Effect Thruster

Figure 1A:
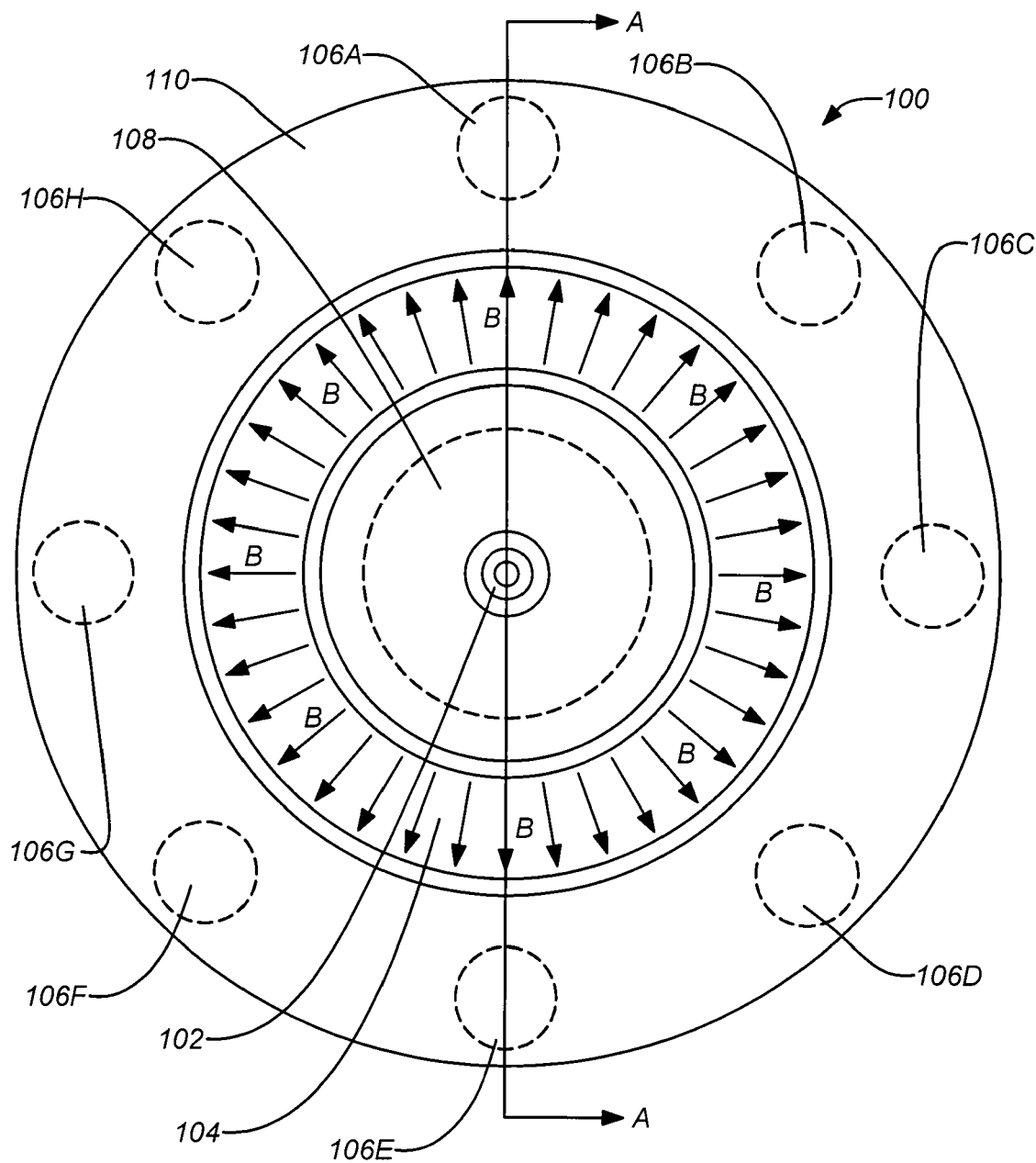
FIGS. 1A and 1B are schematic diagrams of an exemplary Hall effect thruster employing a central electron emitting cathode.
Figure 1B:
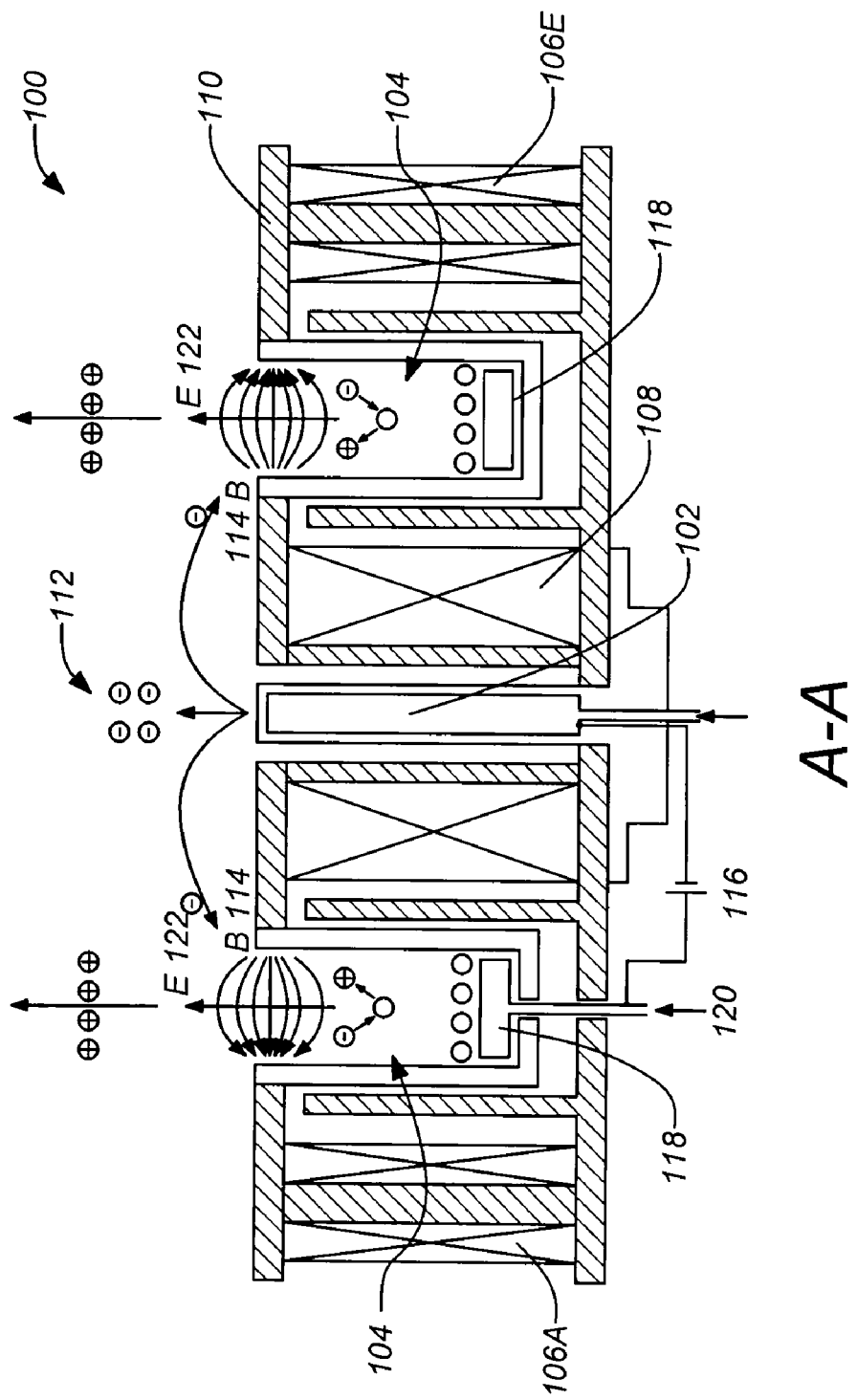

FIGS. 1A and 1B are schematic diagrams of an exemplary Hall effect thruster 100 employing a central electron emitting cathode 102. FIG. 1A shows a top view of the thruster and FIG. 1B shows cross section A-A. The thruster 100 employs an annular cavity 104 for ionizing and accelerating gas particles which are ejected from the cavity to develop thrust. A magnetic (B) field 114 is developed radially (from the center to the outer rim) across the open end of the annular cavity 104 by any techniques known in the art. Typically, a magnetic circuit is formed using multiple electromagnetic coils 106A-106H, 108 and a ferrous housing 110 appropriately constructed to produce the magnetic field 114 as shown in FIGS. 1A and 1B. In the example thruster 100, eight outer electromagnetic coils 106A-106H and one larger central electromagnetic coil 108 are employed although those skilled in the art will appreciate that any combination of coil number and sizes may be employed as necessary to develop the proper magnetic field 114 strength.

Referring to FIG. 1B, the centrally mounted electron emitter cathode 102 emits electrons 112 from an end that is right at the plane of the opening of the annular cavity 104 (illustrated as circular symbols with a negative sign). Positioning the cathode in this way reduces keeper sputtering of the cathode 102, which can increase as the cathode 102 is extended beyond the plane of the opening of the annular cavity 104. Performance can be optimized by iteratively adjusting the cathode 102 end extension position beyond the opening of the annular cavity 104 and testing. (Details of the cathode 102 will be described in the following sections.) In this example, the cathode 102 is disposed in the center of the single large central coil 108 for developing the magnetic field 114. The electrons 112 from the emitter cathode 102 are drawn to the annular cavity 104 by a voltage 116 between the cathode 102 and at least one anode 118 disposed at the bottom of the annular cavity 104. Movement of the electrons 112 drawn to the annular cavity 104 is influenced by the magnetic field 114 such that the electrons become trapped and spiral around the annular cavity 104. Typically, the anode 118 is also used to deliver a gas 120 (e.g. xenon) which flows through it to the bottom of the annular cavity 104 (illustrated as neutral circular symbols above the anode 118). The downstream side of the trapped cloud of electrons 112 in the annular cavity 104 forms a "virtual" cathode, an electrical extension of the central cathode 102. An electric (E) field 122 is defined from the anode 118 to this "virtual" cathode in a vertical direction out of the annular cavity 104. Energized electrons 112 in the annular cavity 104 also impact and ionize the gas 120. The gas 120 ions (illustrated as circular symbols with a positive sign) are driven by the electric field 122 and expelled out of the annular cavity 104 imparting a reactive force to the thruster 100 in the opposite direction. Some additional electrons 112 from the cathode 102 are attracted by the expelled gas 120 ions and drawn out with them where they neutralize the ion beam.

It should be noted that the foregoing description of the electron emitter cathode 102 operating in the Hall effect thruster 100 is only one example use for the cathode 102 embodiment of the invention which demonstrates the cathode 102 disposed in the center of the annular cavity 104. Other applications and uses will be apparent to those skilled in the art based on the detailed description including key elements of the structure and method of operation of the cathode 102 as described in the following sections. An essential element of the electron emitter cathode is the rare earth insert which is the source of the electron emission.

3. LaB$_6$ Electron Emitter Cathode Inserts

Thermionic emission by various rare earth electron emitter cathode materials as inserts is well described by the Richardson-Dushman equation:

$$J = AT^2 e^{\frac{-e\phi}{kT}} \quad (1)$$

where A is a universal constant with a value of 120 A/cm$^2$·K$^2$. See, Richardson, O. W., "Electron Theory of Matter," Phillips Magazine, Vol. 23, 1912, pp. 594-627. Experimental investigations of the thermionic emission of different materials report values of A that vary considerably from the theoretical value. This has been handled by a temperature correction for the work function of the form:

$$\phi = \phi_0 \alpha T \quad (2)$$

where $\phi_0$ is the classically reported work function at absolute zero and $\alpha$ is an experimentally measured constant. See Forrester, A. T., Large Ion Beams, Wiley-Interscience, New York, 1988. This dependence can be inserted into Equation (1) to give:

$$J = Ae^{\frac{-e\alpha}{k}} T^2 e^{\frac{-e\phi_0}{kT}} = DT^2 e^{\frac{-e\phi_0}{kT}} \quad (3)$$

where D is the temperature-modified coefficient to the Richardson-Dushman equation.

Figures 2A, 2B:
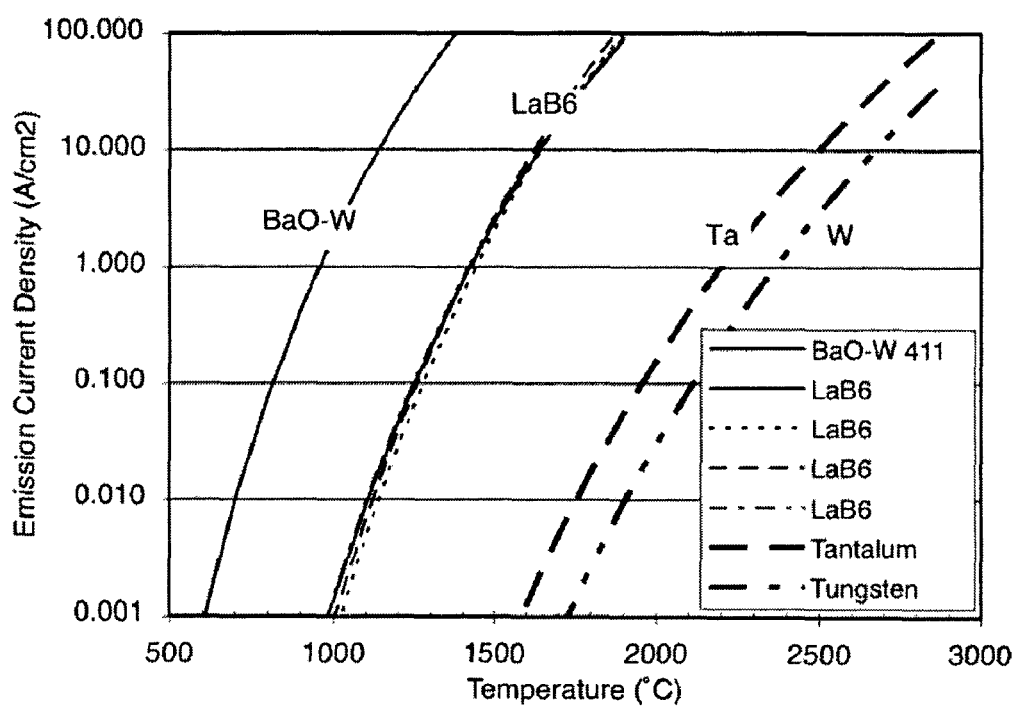
FIG. 2A is table of work function and Richardson coefficients for different electron emitter insert materials.
FIG. 2B is a plot of emission current density versus temperature for different electron emitter insert materials.

FIG. 2A shows a table of the work function and values of A and D for different electron emitter materials. Several different work functions have been reported in the literature for LaB$_6$. This is primarily due to varying use of A or D in Equation (3), variations in the surface stoichiometry, or due to different crystal orientations in single-crystal emitters used for some applications. For hollow cathode and large area emitter applications, the press-sintered LaB$_6$ material is polycrystalline and the work function is an average over the different crystal orientations at the surface.

FIG. 2B is a plot of the emission current density calculated from Equation (3) as a function of emitter temperature for the materials in the table of FIG. 2A. Remarkably, the actual emission current density of LaB$_6$ predicted by the different authors in the table of FIG. 2A is within about 25% for the different values of A, D, and $\phi$ used. It is seen that the LaB$_6$ operates at several hundred degrees higher temperature than the BaO—W dispenser cathode for the same emission current density. The LaB$_6$ temperature is also significantly lower than the typical refractory metal emitters used for filaments in some plasma discharges.

Figure 2C:
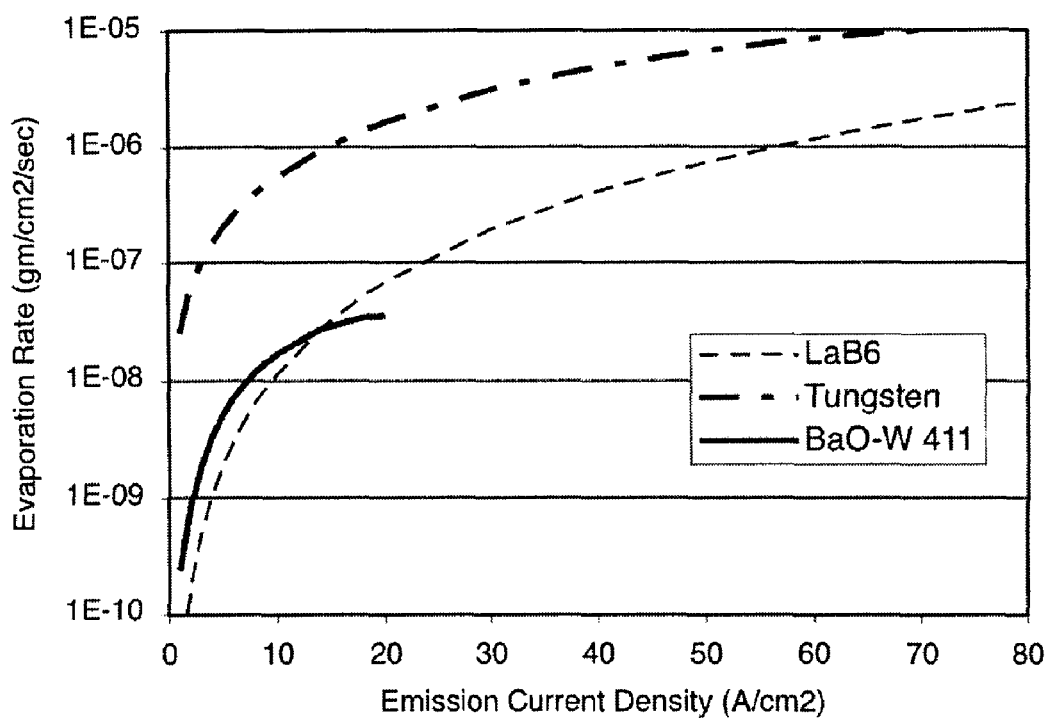
FIG. 2C is a plot of the evaporation rate of $LaB_6$ compared to tungsten and type-S dispenser cathodes.

FIG. 2C is a plot of the evaporation rate of LaB$_6$ and tungsten as a function of the emission current density. See, Kohl, W. H., Handbook of Materials and Techniques for Vacuum Devices, Reinhold, N.Y., 1967; and Leung, K. N., Pincosy, P. A., and Ehlers, K. W., "Directly Heated Lanthanum Hexaboride Filaments," Review of Scientific Instruments, Vol. 55, No. 7, July 1984, pp. 1064-1068. Lanthanum hexaboride offers long lifetimes because the evaporation rate is significantly lower than for refractory metals. LaB$_6$ evaporation is more than one order of magnitude lower when compared to tungsten at the same emission current density. For comparison, the evaporation rate of BaO from a type-S 411 dispenser cathode is also shown. In spite of operating at a significantly higher temperature, the LaB$_6$ has a lower evaporation rate than the impregnate material in dispenser cathodes until the emission current exceeds about 15 A/cm$^2$. This illustrates why the LaB$_6$ cathodes life is usually larger because there is more material in the bulk LaB$_6$ than in the impregnated pores of dispenser cathodes, and the evaporation rate is lower or comparable up to about 20 A/cm$^2$.

Lafferty pointed out in his original 1951 paper (cited above) that LaB$_6$ must be supported by materials that inhibit diffusion of boron into the support material, which would embrittle most of the contacting refractory metals that can be used at the higher operating temperatures of LaB$_6$ and lead to structural failure. In addition, the crystalline LaB$_6$ is susceptible to breakage from mechanical stress when clamped and from thermal shock. Several authors have supported LaB$_6$ with carbon, tantalum carbide, and rhenium to avoid this problem, or constructed support structures with the interface material at lower temperatures. See, Favreau, L. J., "Cataphoretic Coating Lanthanum Boride on Rhenium Filaments," Review of Scientific Instruments, Vol. 36, No. 6, June 1965, pp. 856-857; and Boers, A. N., "Electron Gun Using Long-Life Lanthanum Hexaboride Cathode," Journal of Applied Physics, Vol. 38, No. 4, 1967, pp. 1991-1992. Fine-grain graphite has a slightly larger coefficient of thermal expansion than LaB$_6$ and provides good electrical contact and low stress support without significant boron diffusion or boride formation. For this reason, the example hollow cathodes described herein may employ a graphite tube with a LaB$_6$ insert.

Comprehensive investigations into the poisoning of dispenser cathodes and LaB$_6$ cathodes have been published in the literature. See, Cronin, J. L., "Practical Aspects of Modern Dispenser Cathodes," Microwave Journal, September 1979; and Gallagher, H. E., "Poisoning of LaB6 Cathodes," Journal of Applied Physics, Vol. 40, No. 1, January 1969, pp. 44-51. The most potent poisons for both cathodes are oxygen and water, with other gases such as $CO_2$ and air causing poisoning at higher partial pressures. As mentioned previously, LaB$_6$ is significantly less sensitive to impurities that tend to limit the performance and life of the barium dispenser cathodes.

Figure 2D:
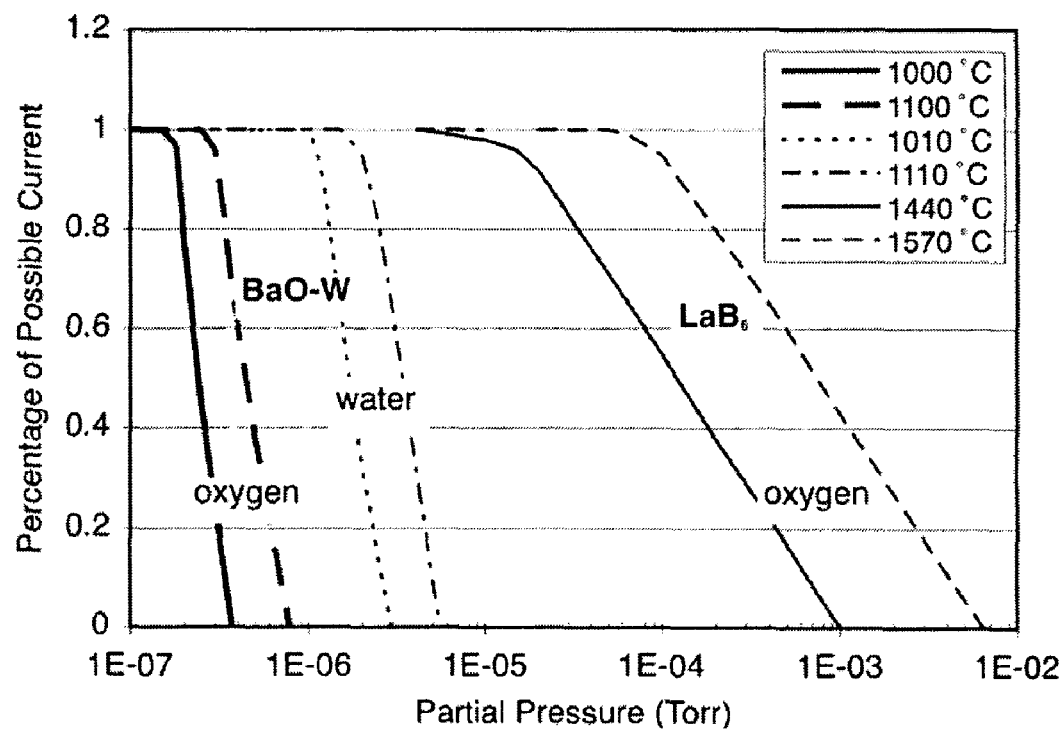
FIG. 2D is a plot of possible thermionic emission percentage versus partial pressure of oxygen and water for different electron emitter insert materials relative to $LaB_6$.

FIG. 2D is a plot of the fraction of the possible thermionic emission given by Equation (3) for a dispenser cathode and LaB$_6$ as a function of the partial pressures of oxygen and water for two different emitter temperatures. The curve for water poisoning of LaB$_6$ is off the graph to the right at much higher partial pressures. It can be seen that a partial pressure of oxygen below $10^{-6}$ torr in the background or feed gas exposed to a dispenser cathode at temperatures of up to 1100° C. will cause significant degradation in the vacuum electron emission. In a similar manner, water vapor at partial pressures below $10^{-5}$ torr will poison dispenser cathodes at temperatures below 1110° C. For typical pressures inside hollow cathodes in excess of 1 torr, this partial pressure then represents the best purity level that can be achieved by the gas suppliers, resulting in the high propulsion-grade purity mentioned previously.

In comparison, LaB$_6$ at 1570° C., where the electron emission current density is nearly the same as for the dispenser cathode at 1100° C., can withstand oxygen partial pressures up to $10^{-4}$ torr without degradation in the electron emission. This means that LaB$_6$ can tolerate two orders of magnitude higher impurity levels in the feed gas compared to dispenser cathodes. For the example of xenon ion thrusters, LaB$_6$ cathodes can tolerate the crudest grade of xenon commercially available (approximately 99.99% purity) without affecting the LaB$_6$ electron emission or life. Lanthanum hexaboride cathodes also do not require any significant conditioning, activation, or purging procedures that are normally required by dispenser cathodes. This robustness makes the handling and processing of thrusters that use LaB$_6$ cathodes significantly easier than electric propulsion devices that use dispenser cathodes.

4. Exemplary Electron Emitter Cathodes

Figure 3A:
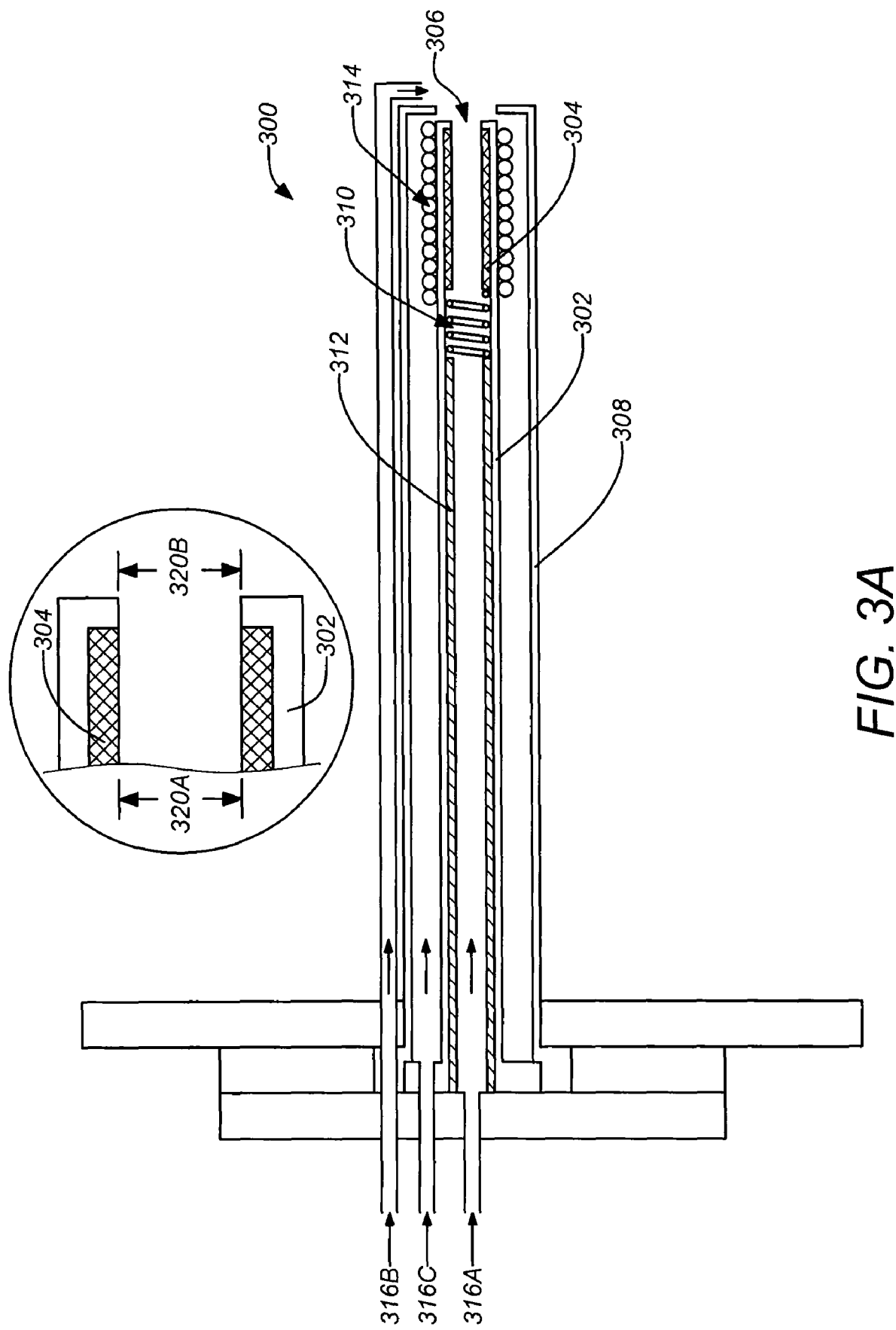
FIGS. 3A and 3B is schematic diagram of an exemplary electron emitter cathode embodiment of the invention.
Figure 3B:
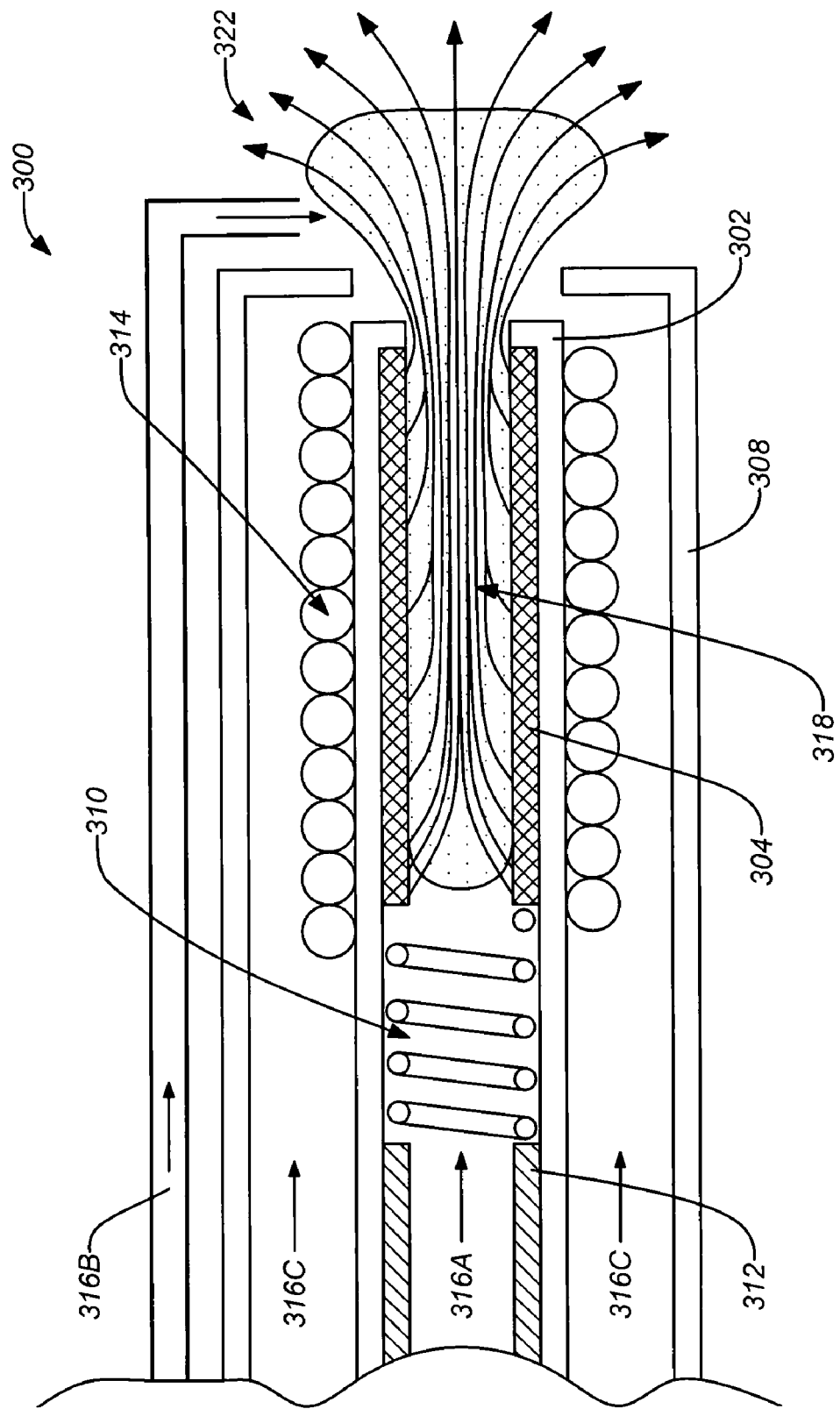

FIGS. 3A and 3B is a schematic diagram of an exemplary electron emitter 300 embodiment of the invention. The electron emitter 300 (which may also be referenced generally as a "cathode") possesses very high aspect ratio geometry, typically 10 or higher. For example, a length/width (outside diameter) ratio of 15 for the cathode 302 may be employed. The aspect ratio is defined only considering the cantilevered portion of the cathode tube extending beyond any other element for thermal conduction. For comparison, the previous cathodes used in the NSTAR ion thruster have aspect ratios (cathode tube length/cathode tube diameter) of approximately 8. Employing a high aspect ratio with embodiments of the invention helps to thermally isolate the cathode end and trap heat in the insert 304 to aid in the electron emission. The hollow conductive cathode 302 is disposed at the center of the electron emitter 300. The cathode 302 includes an orifice 306 at the end. The end of the cathode 302 is cupped slightly to retain the insert 304 making the orifice area 306 smaller than the internal cross sectional area of the cathode 302. An essential functional element of the cathode 302 is the hollow rare earth insert 304 which provides for the electron emissions as previously discussed. The hollow rare earth insert 304 is disposed within and near the end of the cathode 302.

Cathodes in accordance with the present invention employ an insert 304 having a internal cross sectional area no larger than the cathode orifice area 306, i.e. the cathode orifice area 306 is at least as large as the internal cross sectional area of the insert 304. The insert 304 is not cupped like the end of the cathode 302, so the hollow insert 304 is constructed with a through hole defining the internal cross sectional area. Thus, the internal cross sectional area of the insert 304 defines the functional orifice of the cathode 302. The cathode orifice area 306 is typically substantially the same size as the internal cross sectional area of the insert 304 (although the cathode orifice area may be optionally larger than the internal cross sectional area of the insert 304). This is a novel development over conventional cathodes which employ cathode orifices as an orifice smaller than the internal cross sectional area of the insert.

It should be noted that although other geometric shapes are possible, most elements of the electron emitter 302, e.g., cathode 302, insert 304, keeper 308, are typically cylindrical. In this case, all the aforementioned "areas" may be described as diameters. In this case, the inside diameter (ID) of the insert is no larger than orifice diameter of the cathode. These diameters may be substantially identical (although it is possible that the cathode orifice diameter may be larger than the internal diameter of the insert in some cases). See the inset of FIG. 3A which shows an enlarged view of the cathode end illustrating the relationship between the inside diameter 320A of the insert and the cathode orifice diameter 320B.

The insert 304 may be held in position against the cupped end of the cathode 302 by a retainer 312 and spring 310 disposed in series behind the insert 304. The spring 310 is employed to accommodate thermal expansion arising from the extreme temperatures at the cathode end during operation. The retainer 312 is typically a ceramic, while the spring may be formed from either carbon or tungsten, although tungsten may be used only if the spring is disposed away from the insert behind the retainer at the far end of the cathode (not shown).

As previously discussed, electron emission occurs from the rare earth insert 304 as energy is applied to the hollow rare earth insert 304, electrons are emitted from the inner surface of the insert and a portion of the electrons flow out the cathode end. Energy may be applied to the insert 304 through a number of techniques depending upon the operational stage and application. Electron emission is typically initiated by simply heating the insert 304. Accordingly, an electrical heater element 314 is coiled around the end of the cathode 302 proximate to the insert 304.

FIG. 3B is an enlarged view of the electron emitter 300 end and illustrates electron emission developed after being initiated by heating with the heater element 314. At this stage, a gas flow 316A (such as xenon) is delivered down the hollow cathode 302. When the gas flow 316A reaches the insert 304 emitted electrons from the inner surface of the insert 304 ionize the gas flow 316A and produce a plasma 318. Generation of the plasma may be sustained without using the heater element 314 by setting up a voltage differential between the cathode 302 and some other element. In the case of Hall thruster operation, the voltage differential may be established between the cathode 302 and an anode in the bottom of the annular cavity of the thruster (as described in FIG. 1B). However, the electron emitter 300 also typically employs a hollow conductive keeper 308 which surrounds the cathode 302. The keeper 308 also has an end orifice which is typically larger than the end orifice of the cathode 302. A voltage differential may be applied between the keeper 308 and the cathode 302 in the same manner. In either case, the voltage differential between the cathode 302 and the other element (thruster anode and/or keeper 308) causes electrons 322 to be drawn out of the insert 304 while positively charged gas ions of the plasma 318 are drawn to the inner surface of the insert 304. The gas ions of the plasma 318 impact the inner surface of the insert 304 and impart further energy to the insert 304 which results in more electrons 322 being emitted. In this manner, the plasma 318 generation and electron 322 flow may be sustained without requiring further use of the heater element 314 as electron emission derived from heating is more inefficient.

The electron emitter 300 may also employ one or more auxiliary gas feeds to enhance operation, particularly when used in a Hall thruster. For example, an auxiliary gas feed may provide a supplemental gas flow 316B to be delivered external to the keeper 308 orifice. Alternately (or additionally), another auxiliary gas feed may be provided with a gas flow 316C delivered to the annular space between the cathode 302 and the keeper 308. Fuel efficiency of the electron emitter 300 (and therefore the overall thruster efficiency) can be greatly improved through the use of one or more auxiliary gas feeds, particularly the supplemental gas flow 316B external to the keeper 308 orifice.

To take advantage of the reduced gas purity requirements of the material and to provide high discharge currents with long life, a LaB$_6$ hollow cathode insert can be used for electric propulsion applications. Three different sizes of the basic electron emitter cathode design have been built and tested to provide various current ranges and to fit into different thruster sizes. The basic design employs a LaB$_6$ insert in an all-graphite hollow cathode structure with an integral graphite keeper. The smaller version of this cathode electron emitter has been operated in xenon from 7.5 to 60 A continuously, and the larger versions tested at discharge currents of up to 100 A. The characteristics of LaB$_6$ and the hollow cathode using this material offer improved performance over similar sized dispenser cathodes.

Figure 3C:
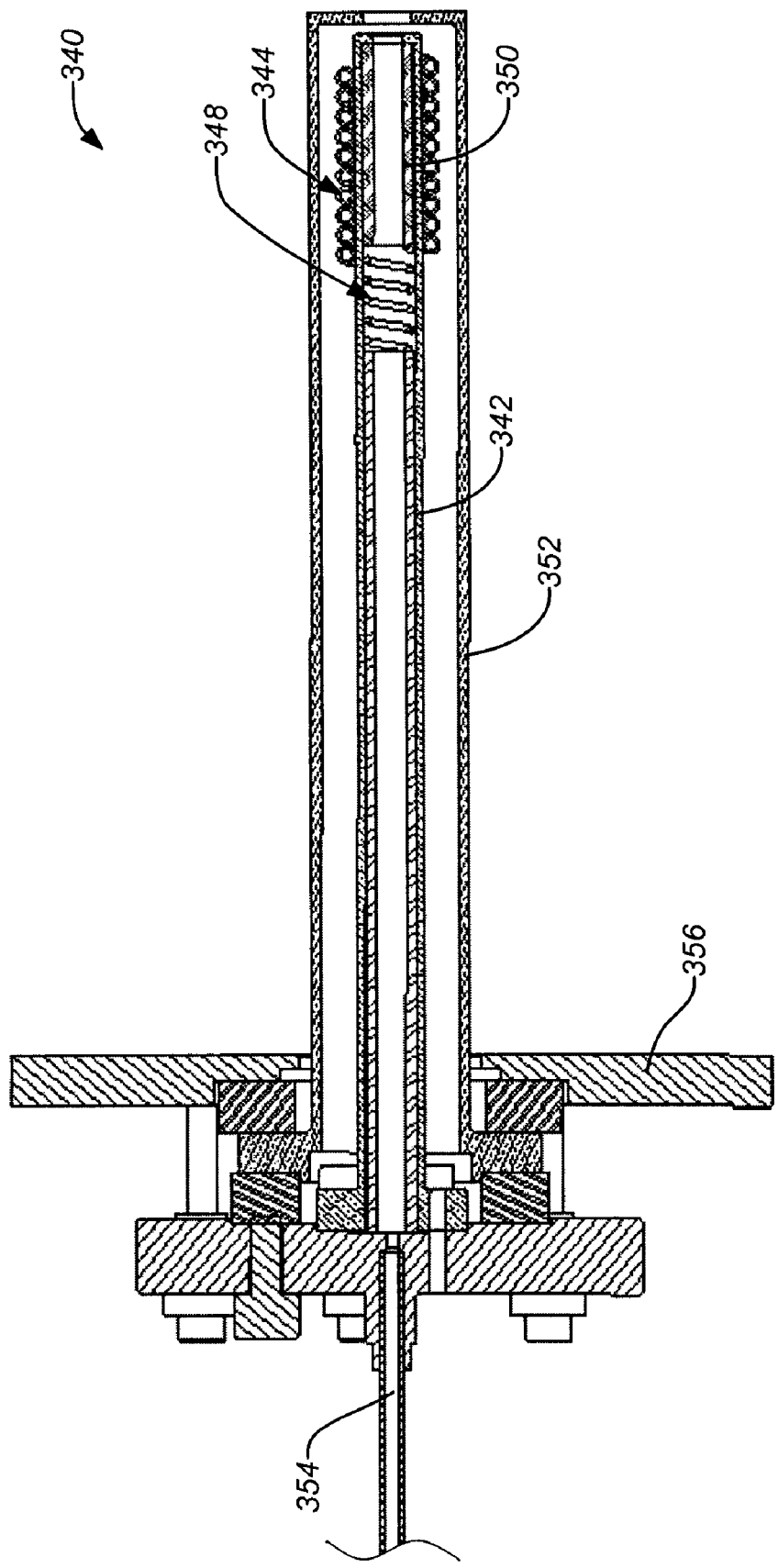
FIG. 3C illustrates an exemplary electron emitter cathode embodiment of the invention.

FIG. 3C illustrates an exemplary electron emitter 340 cathode embodiment of the invention. The exemplary electron emitter 340 cathode comprises a compact, high-current LaB$_6$ hollow cathode 342 assembly developed to improve performance and life associated with the increased power of Hall thrusters. The emitter 340 overcomes significant design issues that arise in the low end of the power range associated with miniaturization as well as thermal issues. Careful attention to materials compatibility issues, advanced thermal designs for the heater, limiting conductive and radiative losses, and extensive cathode characterizations of the insert geometry can further improve cathode performance and life as will be appreciated by those skilled in the art. The heater coil 344 is shown wrapped over the end of the cathode 342 tube. In the fully assembled cathode electron emitter 340, the heater coil 344 may be wrapped in a tantalum radiation shielding in order to help reduce thermal losses from the keeper electrode. The insert retainer 346 and spring 348 hold the hollow rare earth insert 350 against the end of the hollow cathode 342. The orifice of the cathode 342 in the cathode end is at least as large as the inner diameter of the insert 350. The hollow conductive keeper 352 surrounds the cathode assembly with an orifice near the cathode end that is at least as large as the cathode orifice (typically larger). The gas feed 354 provides the gas flow to the hollow cathode 342. The supporting structure 356 of the cathode 342 and keeper 352 (which mounts to the back end of the thruster as previously shown in FIG. 1A) is designed to provide adequate structure to survive expected environments (vibration, thermal, etc.). In addition, the supporting structure 356 provides electrical isolation between the cathode 342, keeper 352, as well as the heater 344.

In one example, a compact, high-current design has been achieved with a keeper diameter of only 0.786 in and a keeper orifice diameter of 0.24 in. The cathode tube orifice is equal to the insert inner diameter of 0.151 in. The insert length is 1 in. For comparison, the discharge cathode used on the NSTAR ion thruster has a keeper OD of 0.75 in, but is only capable of emission currents of about 15 A. An example compact LaB$_6$ cathode embodiment of the invention is nearly the same size as the NSTAR cathode, but is capable of long-life operation over a range of currents of 10-60 A.

Experiments have shown that the use of a cathode orifice at least equal to the insert internal diameter enhances performance of embodiments of the invention. This departs from traditional barium oxide cathode designs that typically have cathode orifice diameters less than the insert diameter, resulting in high internal pressures and less plasma contact with the insert. In addition, experiments have also shown that thermal losses from the cathode which would manifest through overheating of the inner magnetic circuit have been limited so as not to inhibit operation of the thruster. Further, performance of this thruster has been outstanding. Thrust efficiency can be significantly increased compared to other advanced Hall thruster designs.

As discussed above, one or more auxiliary gas feeds can further enhance performance of the electron emitter cathode. An example configuration diverts a fraction of the total cathode gas flow to an external gas feed delivering an auxiliary gas flow externally to the keeper orifice. This has been shown experimentally to improve the cathode coupling efficiency at lower total flow rates. This has the benefit of improving the overall thruster mass utilization efficiency, which improves overall thruster efficiency. This configuration may signifi-
cantly improve thruster efficiency. Improvements in thruster efficiency can result in large changes in the propellant required for a given space mission.

Depending on the particular mission, a reduction in gas propellant loads can lead to mission enabling capabilities by allowing either employing a lower payload launch vehicle (saving tens of millions of dollars), greater payload capability (allowing more science to be conducted), or extending the life of a spacecraft by allowing more gas propellant to be used to provide useful thrust.

As previously described, LaB$_6$ hollow cathodes embodiments of the invention for space applications can comprise an active thermionic insert placed inside a structural cathode tube wrapped by a heating element and heat shields. However, LaB$_6$ cathodes typically require more heater power to achieve the necessary higher emission temperatures. BaO dispenser cathodes commonly use a coiled tantalum sheathed heater that uses a magnesium-oxide powder insulation. See, Soulas, G. C., "Status of Hollow Cathode Heater Development for the Space Station Plasma Contactor," AIAA Paper 1994-3309, 1994; and Tighe, W. G., Freick, K., and Chien, K. R. "Performance Evaluation and Life Test of the XIPS Hollow Cathode Heater," AIAA Paper 2005-4066, 2005. This insulation material has a maximum operation temperature typically less than 1400° C., at which chemical reactions between the oxide insulation and the heater electrode or sheath material cause a reduction in the resistance and ultimately failure of the heater. To first demonstrate the LaB$_6$ cathode performance, a tantalum heater wire was strung through alumina fish-spine beads and wrapped in a non-inductive coil around the hollow cathode tube. Although only a laboratory tool, a heater like this can provide over 250 W of power to heat the cathode, and initial tests successfully used a heater of this type. Subsequently, a tantalum sheathed heater that incorporated high-temperature alumina powder insulation was procured and used to heat the LaB$_6$ cathode (Catalog item from Idaho Labs, Idaho Falls, Id.). This geometry is common in industrial metal furnace heaters and can be found in the standard catalog of several companies as will be understood by those skilled in the art. The heater catalogs indicate that the alumina insulation has a maximum temperature of about 1800° C., which is well in excess of the temperature required to start the LaB$_6$ cathode.

As mentioned above, the structural cathode tube in contact with the LaB$_6$ insert may be made of graphite because it has a similar coefficient of thermal expansion as LaB$_6$, and fabrication of the entire hollow cathode tube out of a single piece of high-purity graphite is straightforward. See, Chen, C.-H., Aizawa, T., Iyi, N., Sato, A., and Otani, S., "Structural Refinement and Thermal Expansion of Hexaborides," Journal of Alloys and Compounds, Vol. 366, No. 1-2, 2004, pp. L6-L8. The keeper electrode used to initiate the discharge may also be fabricated from the high-purity graphite. An example LaB$_6$ cathode (in the configuration of FIG. 3C) can comprise a 1.5 cm outside diameter (OD) graphite tube with a wall thickness of 0.1 cm, and a LaB$_6$ insert with a wall thickness of about 0.3 cm and a length of approximately 2.5 cm. This yields an active emitting surface area inside the cathode insert of approximately 5 cm$^2$, which according to the table of FIG. 2A can produce emission currents of 100 A at temperatures of about 1700° C. The insert may be held in place by a slotted carbon spring that pushes the insert against the orifice plate. The all-carbon geometry can eliminate the materials compatibility issues with LaB$_6$ and makes the cathode electrodes more robust against ion sputtering in xenon discharges due to the low erosion yield compared to the refractory metals used in conventional cathodes. See, Doerner, R., White, D., and Goebel, D. M., "Sputtering Yield Measurements During Low Energy Xenon Plasma Bombardment," Journal of Applied Physics, Vol. 93, No. 9, May 2003, pp. 5816-5823. The carbon cathode tube and the carbon keeper are bolted to support and insulating flanges that are attached to the gas feed system and the power supply electrical leads.

As will be understood by those skilled in the art, many other cathode sizes may also be fabricated according to this basic configuration. For example, a larger diameter cathode with more insert surface area may be employed to provide higher discharge currents. Such a cathode may employ a 2-cm diameter graphite cathode tube with the same tube wall and insert thicknesses as the 1.5 cm cathode described above. The mounting and spring geometry are also the same as the 1.5 cm cathode. In another example, a smaller cathode with a cathode tube OD of 0.8 cm may be fabricated. This cathode may be used to operate in smaller thrusters at lower discharge currents, and so features a longer, thinner cathode tube to minimize heat conduction from the insert to the base and extra heat shielding around the insert region. The insert in the 0.8 cm cathode can comprise an inside diameter (ID) of approximately 0.38 cm, identical to that of the cathode orifice. All of the example cathodes employ cathode orifice diameters of 0.38 cm and keeper orifice diameters of 0.64 cm. In the case of the 0.8 cm cathode, the orifice and insert ID are the same.

Constructed cathodes may be tested in a 1-m diameter by 2-m-long vacuum system with 1250 l/s xenon pumping speed from two cryopumps, and mounted on a scanning probe assembly used to measure the density, temperature, and potential inside the hollow cathode in the insert region. See, Goebel, D. M., Jameson, K., Watkins, R., and Katz, I., "Hollow Cathode and Keeper-Region Plasma Measurements Using Ultra-Fast Miniature Scanning Probes," AIAA Paper 2004-3430, 2004; and Jameson, K., Goebel, D. M., and Watkins, R., "Hollow Cathode and Keeper-Region Plasma Measurements," AIAA Paper 2005-3667, 2005. A solenoid coil may be positioned around the keeper electrode to provide an adjustable axial magnetic field at the cathode exit. The test anode may comprise a water-cooled cone connected directly to a straight cylindrical section to simulate an ion thruster discharge chamber. Rings of permanent magnets may be attached to the outside of the anode to provide some magnetic confinement of the plasma electrons to improve the ionization efficiency in the anode region. This configuration can produce discharge voltages in the 20-30 V range, depending on the current and gas flow rate, which is characteristic of thruster discharges.

Figure 3D:
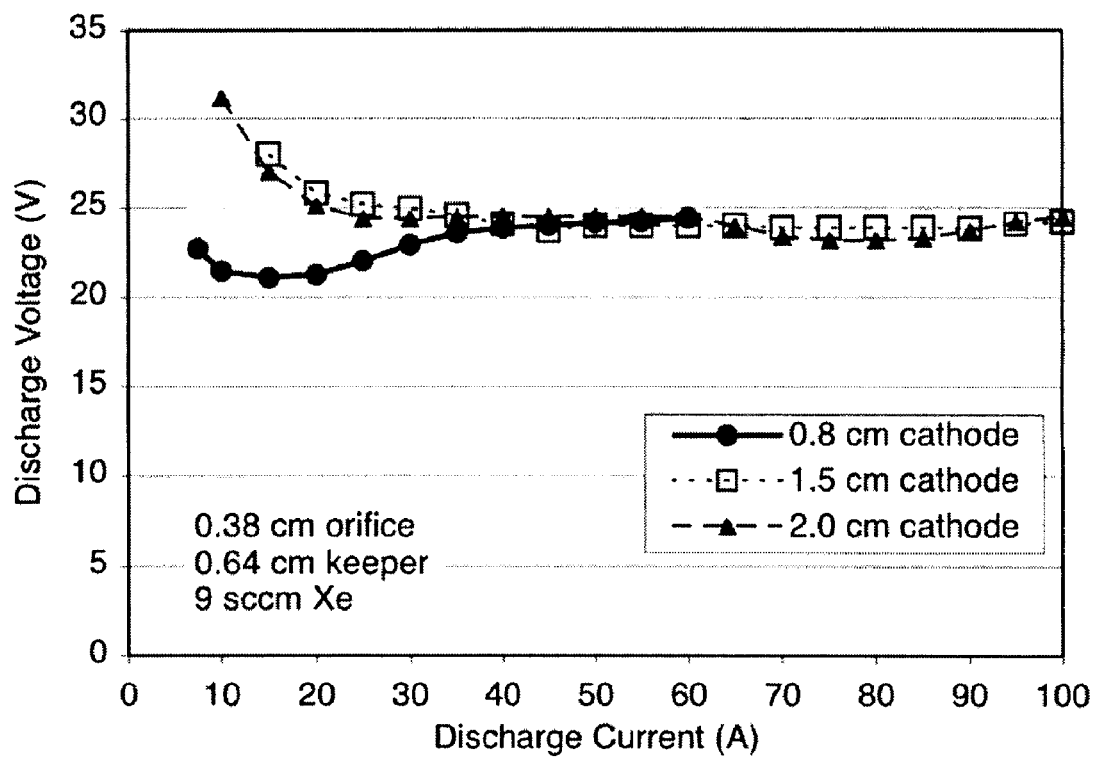
FIG. 3D shows the discharge voltage versus discharge current measured for three different sized example test cathodes in the same test configuration at 9 sccm.

FIG. 3D shows the discharge voltage versus discharge current measured for three different sized example test cathodes in the same example test configuration at 9 sccm (standard cubic centimeters per minute) xenon flow. During testing, after installation in the test facility, the system was pumped down into the $10^{-6}$ torr range and the cathode heater turned on for 5-10 min. The cathode discharge was then started by initiating the xenon gas flow through the cathode, applying 150 V to the keeper electrode and turning on the anode power supply. Once the anode discharge current exceeded about 10 A, the keeper power supply was turned off and the keeper was allowed to float. The two larger cathodes had essentially identical discharge performance characteristics and were tested at currents up to 100 A. A reduction in the cathode gas flow to 7 sccm limited the discharge current to about 60 A, above which significant discharge voltage oscillations were observed. At discharge currents below 20 A, the discharge voltage was observed to increase slightly and the larger cathodes tended to cool off and stop operating at currents below 10 A. This is because the self-heating mechanism in the hollow cathode may depend on the discharge current level, and the lower current levels may provide insufficient heating in these cathodes to maintain the insert temperature. In this case, the voltage drop in the cathode plasma increases to provide sufficient heating, which increases the measured discharge voltage.

The smaller 0.8 cm cathode was operated from a discharge current of about 7-60 A. As shown in FIG. 3D, the discharge voltage did not increase in this case until the discharge current fell below 10 A. This probably occurs because this test cathode is designed with a longer graphite tube to reduce heat loss to the mounting structure, and the smaller cathode size reduces the radiation heat loss area, making it easier for the self-heating mechanism to maintain the insert temperature at lower currents. Because the insert interior surface area is approximately 3 $cm^2$, this insert is capable of emitting 20 $A/cm^2$ for a total of 60 A of emission current at a temperature of 1700° C. These emission current densities and discharge currents are routinely achieved with $LaB_6$ cathodes. Likewise, the 1.5-cm diameter cathode has approximately 5 $cm^2$ of exposed insert area, and so is capable of producing the measured 100 A of discharge current at this same emission current density and temperature. The 2-cm diameter cathode has approximately 10 $cm^2$ of insert area and is capable of 200 A of emission. Power supply limitations precluded testing to currents above 100 A.

Figure 3E:
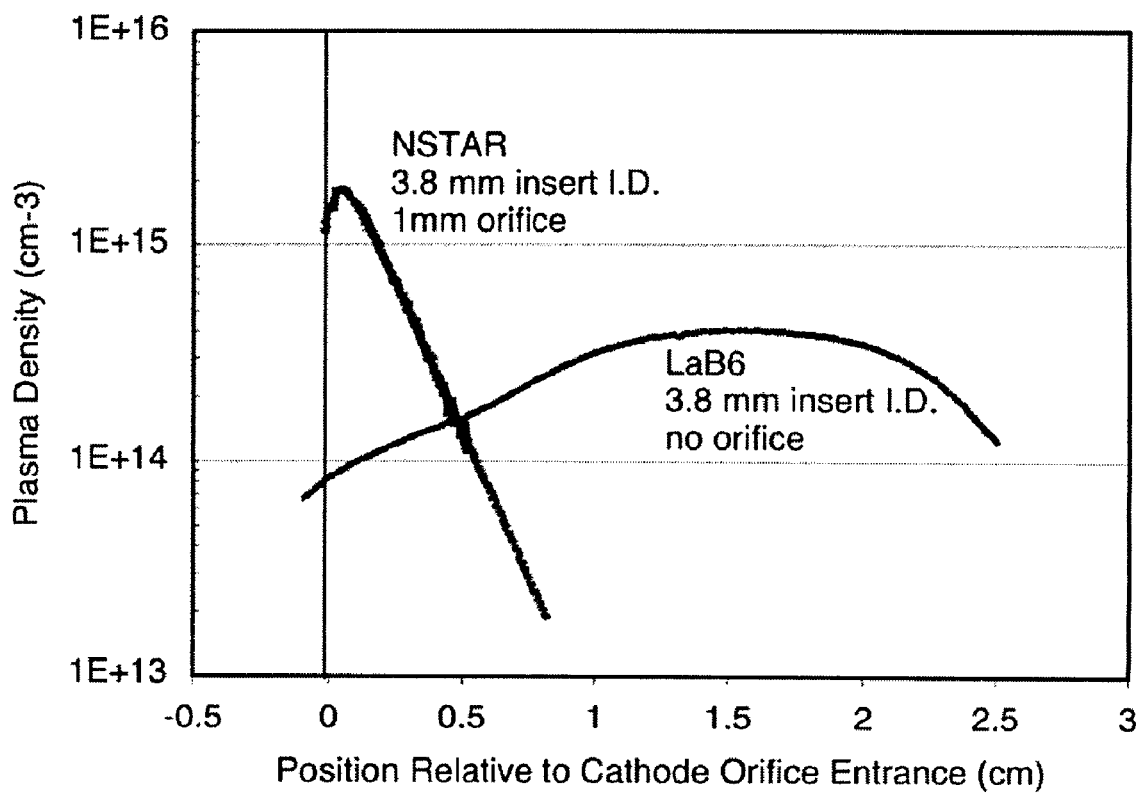
FIG. 3E shows the plasma density profile at 13 A and 3.7 sccm of xenon flow obtained with the example 0.8-cm diameter $LaB_6$ cathode (with no orifice) compared with the known NSTAR dispenser cathode with a 1-mm diameter orifice.

FIG. 3E shows the plasma density profile at 13 A and 3.7 sccm of xenon flow obtained with the example 0.8-cm diameter $LaB_6$ cathode (with no orifice) compared with the known NSTAR dispenser cathode with a 1-mm diameter orifice. To understand the electron emission processes of the $LaB_6$ insert in these hollow cathodes, plasma density profiles were taken by the interior scanning probe and compared to that obtained with a conventional dispenser cathode. The insert ID and length are substantially identical in these two cathodes. The small orifice in the NSTAR cathode increases the pressure in the insert region, which pushes the plasma close to the orifice plate and limits the contact length with the insert. In this case, only the first few millimeters of the insert are emitting current, and most of the power is deposited near the orifice creating a large temperature gradient along the insert, which further limits the electron emission away from the orifice. See, Mikellides, I., Katz, I., Goebel, D. M., and Jameson, K. K. "Plasma Processes Inside Orificed Hollow Cathodes," Physics of Plasmas, Vol. 13, No. 6, 2006, p. 063504; and Mikellides, I., Katz, I., and Goebel, D. M., "Numerical Simulation of the Hollow Cathode Discharge Plasma Dynamics," IEPC Paper 2005-200, 2005. In contrast, the plasma profile in the $LaB_6$ cathode is very broad, and the plasma is in contact with the entire insert length. In addition, the plasma density is sufficient all along the insert length to avoid spacecharge limitations on the emitted electron current density well in excess of 20 $A/cm^2$. Therefore, the insert is operating in the thermally limited emission regime and the emission may be fairly uniform along the insert length if the temperature is constant. Increases in discharge current and gas flow rate may tend to push the plasma density peak toward the orifice, further flattening the profile. Because the plasma is in contact with the entire insert and $LaB_6$ has a good thermal conductivity, the temperature variation along the insert may be small and the emission fairly uniform. Similar broad density profiles may be observed with the 1.5 cm cathode at discharge currents up to about 40 A, indicating that the plasma is in good contact with the entire insert length. Higher discharge currents than this may tend to melt the probe, but the trend of the plasma being in contact with essentially the entire insert length did not change significantly as the current increased.

The life of a $LaB_6$ cathode in vacuum may be determined by the evaporation rate of the material and the size of the cathode. In plasma discharges, sputtering of the $LaB_6$ surface can also impact the life. However, as in a dispenser hollow cathode, the plasma potential is very low in the insert region and the bombardment energy of xenon ions hitting the surface is typically less than 20 V, which can virtually eliminate sputtering of the cathode surface.

Figure 3F:
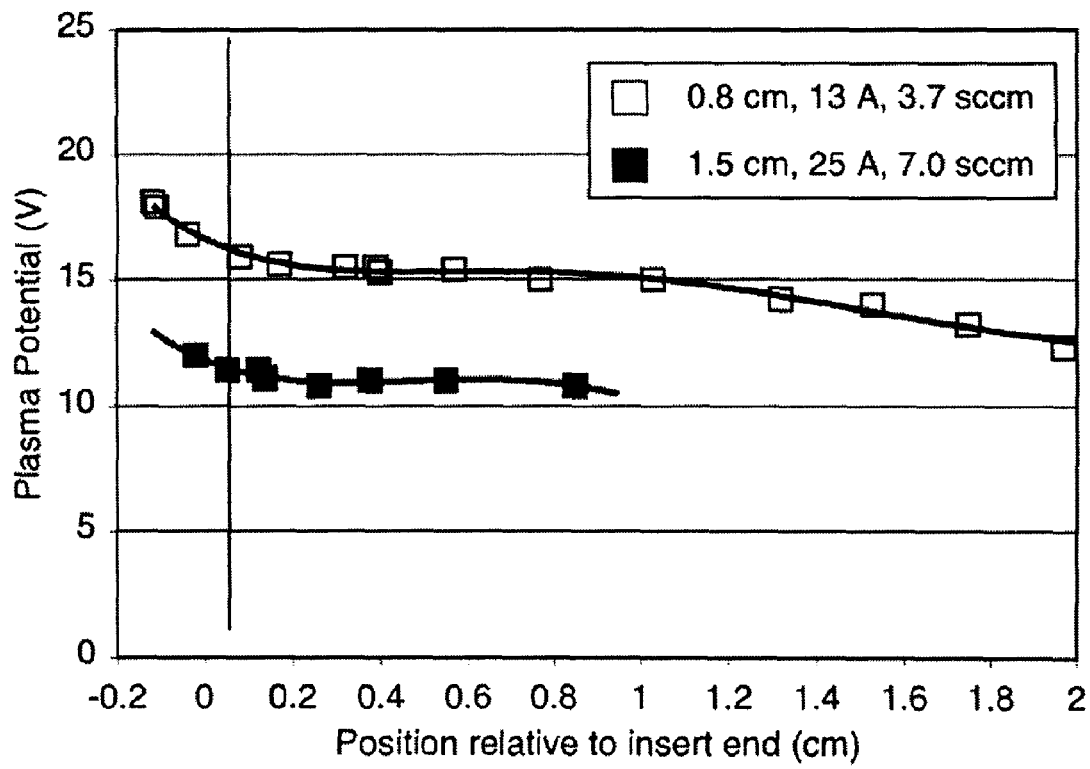
FIG. 3F shows the low plasma potential inside the $LaB_6$ cathodes where the potential on axis in the insert region is measured by the scanning probes for two discharge cases for two of the cathodes.

FIG. 3F shows the low plasma potential inside the $LaB_6$ cathodes where the potential on axis in the insert region is measured by the scanning probes for two discharge cases for two of the cathodes. The potential on axis remained well below 20 V for all the cases investigated and tends to decrease as the discharge current and flow rate increases. This is consistent with the self-heating mechanism of the hollow cathode in that less potential drop is required to heat the cathode as the discharge current increases. Because the potential inside hollow cathodes is so low, the ion sputtering may be neglected yielding estimated cathode life based on evaporation. It may be assumed that the evaporated material leaves the cathode and does not recycle to renew the insert surface, which will provide a lower estimate of the insert life than might actually exist. Interestingly, as the insert evaporates the inner diameter increases and the surface area enlarges. This causes the required current density and temperature to decrease at a given discharge current, which reduces the evaporation rate of the insert.

Figure 3G:
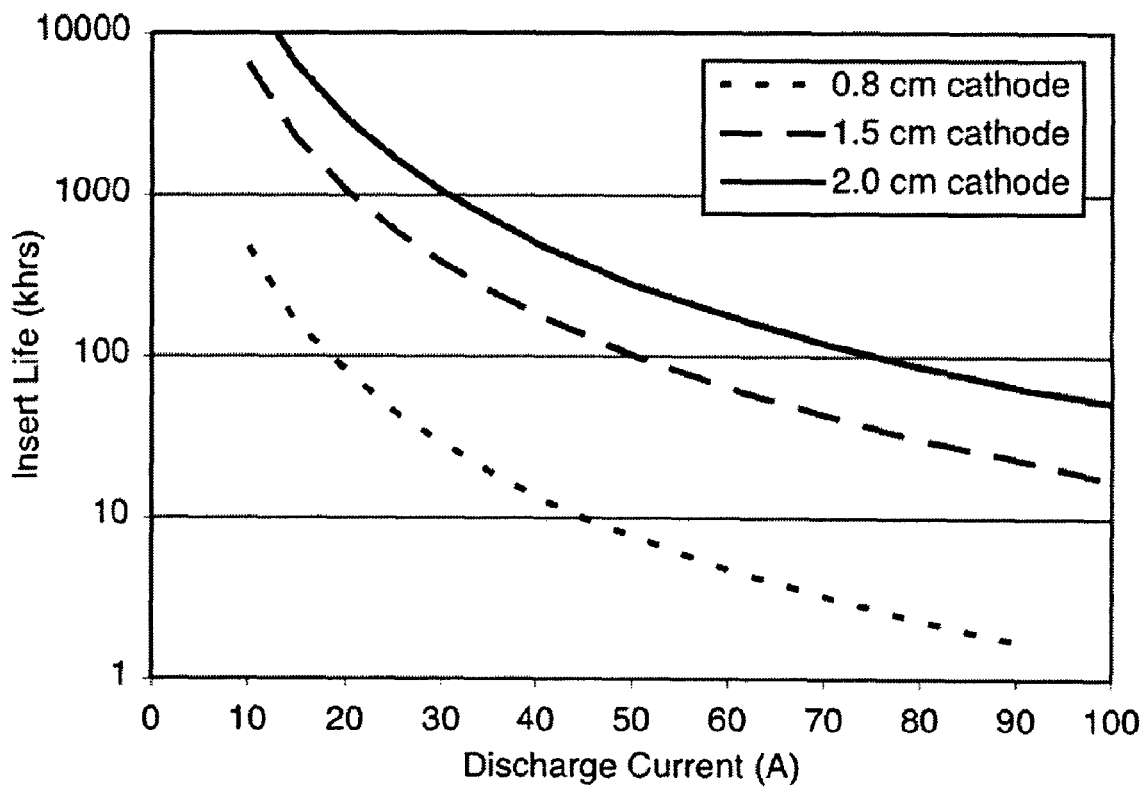
FIG. 3G shows the cathode life as a function of the discharge current assuming that 90% of the insert can be evaporated.

FIG. 3G shows the cathode life as a function of the discharge current assuming that 90% of the insert can be evaporated. The life of the $LaB_6$ insert for the three different cathode sizes described here versus discharge current was calculated based on the evaporation rate at the temperature required to produce the discharge current in the thermally limited regime observed here. Lifetimes of tens of thousands of hours are possible, and the larger cathodes naturally tend to have longer life. Although other mechanisms, such as temperature variations along the insert or $LaB_6$ surface removal or material buildup due to impurities in the gas, can potentially reduce the life, redeposition of the evaporated $LaB_6$ material will tend to extend the cathode life. Therefore, these life estimates are mostly valid relative to each other, and the actual life of the cathode can be considered to be on the order of the values calculated in FIG. 3G.

Figure 3H:
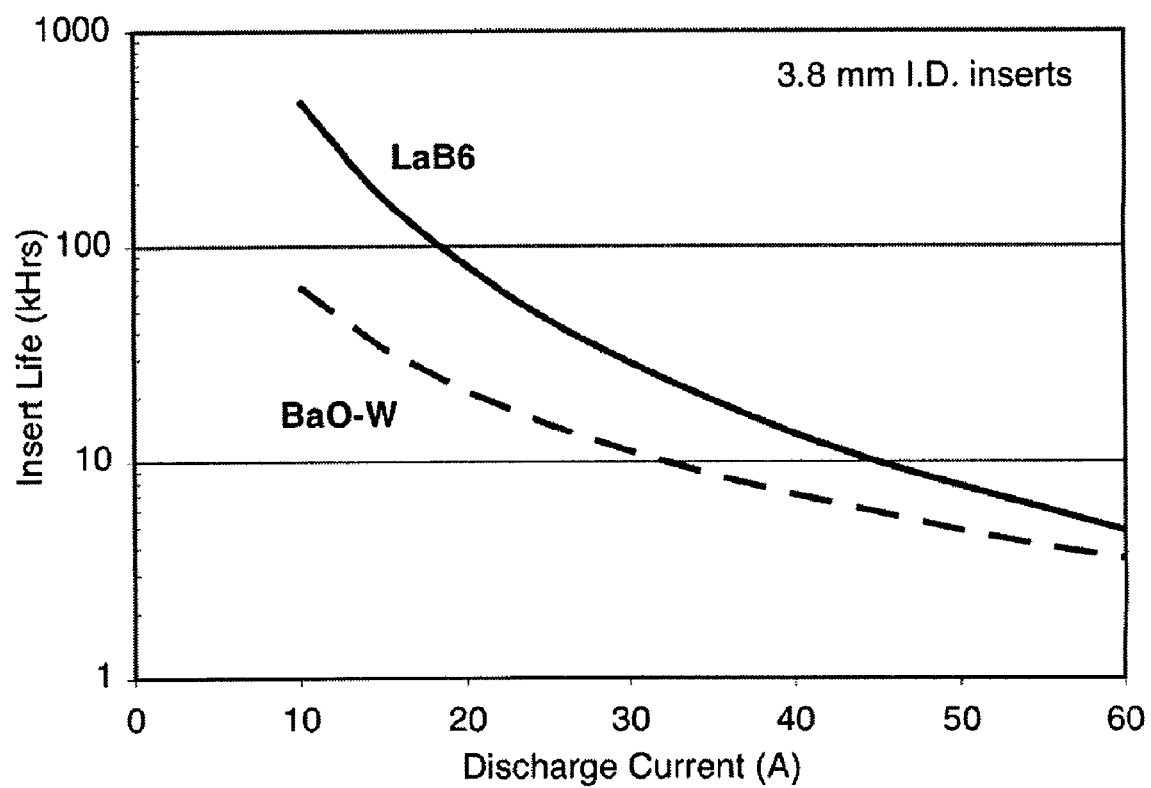
FIG. 3H shows predictions from a dispenser cathode life model applied to the NSTAR cathode compared to the example 0.8 cm cathode life predictions.

FIG. 3H shows the predictions from a dispenser cathode life model applied to the NSTAR cathode are compared to the 0.8 cm cathode life predictions. See, Goebel, D. M., Katz, I., Polk, J. E., Mikellides, I. G., Jameson, K. K., Liu T., and Dougherty, R., "Extending Hollow Cathode Life for Electric Propulsion in Long-Term Missions," AIAA Paper 2004-5911, 2004. These two cathodes have similar insert diameters and lengths and so a direct comparison is reasonable. The dispenser cathode calculation assumes that barium evaporation from the insert surface causes depletion of nearly all of the barium impregnate at the end of life in the NSTAR dispenser cathode at the measured insert temperature and temperature gradient. See, Polk, J., Grubisic, A., Taheri, N., Goebel, D. M., Downey, R., and Hornbeck, S., "Emitter Temperature Distribution in the NSTAR Discharge Hollow Cathode," AIAA Paper 2005-4398, 2005. This provides an upper limit to the dispenser cathode life if other mechanisms such as poisoning or degrading the work function impurity buildup plugging the pores actually causes the cathode life limits. Likewise, recycling of the barium will extend the dispenser cathode life, so uncertainties in the dispenser cathode life estimates by this model have the same uncertainties due to impurities and redeposition that are found for the $LaB_6$ life model (although $LaB_6$ is less likely to be affected by impurities). Therefore we will show a direct comparison of calculated life versus discharge current and realize that the curves will likely shift together vertically due to impurity or redeposition issues. The $LaB_6$ cathode life may be projected to exceed the dispenser cathode life by nearly an order of magnitude at the nominal NSTAR full power currents of less than 15 A. Assuming that the NSTAR cathode can produce higher discharge currents, the $LaB_6$ cathode life is projected to exceed the NSTAR over the full current range demonstrated by this cathode. As seen in FIG. 3G, the larger $LaB_6$ cathodes should have even longer lifetimes, and their life significantly exceeds that projected for the 1.5-cm diameter dispenser cathode that is designed to operate up to about 35 A.

Because the $LaB_6$ cathode operates at several hundred degrees higher temperature than the dispenser cathode, an effort was made to understand the starting mechanism and how the emitter temperature is produced during self-heated operation. Of primary importance is proper heat shielding of the cathode heater, which requires multiple wraps of thermal insulation outside the heater coils to minimize the amount of power required to start the cathode. Initially, the 1.5 cm cathode required 234 W of heater power to ignite. The heat shielding on the outside of the heater was improved and elongated to better shield the graphite tube, and the required heater power for ignition dropped to about 160 W. The 0.8 cm cathode was designed with the longer cathode tube and heat shield and also included more layers of heat shielding to reduce the required heater power to 125 W.

Dispenser cathode discharges start by vacuum thermionic emission from the front of the cathode orifice plate due to barium that has diffused out of the orifice and activated the surface. See, Tighe, W., Chien, K., Goebel, D. M., and Longo, R., "Hollow Cathode Ignition and Life Model," AIAA Paper 2005-3666, 2005. This process requires time for the diffusion and surface chemistry to activate the surface and initiate emission. At a sufficient emission current, the ionization of the gas in the cathode to the keeper gap provides plasma that flows into the orifice, couples to the insert region, and starts the plasma discharge. The $LaB_6$ cathode, in comparison, does not have a mechanism for the orifice plate to become emitting. However, the relatively large orifice diameter (or lack of an orifice) used in high-current hollow cathodes permits a small amount of electric field to penetrate the insert region and extract electrons. Ignition of the discharge by coupling directly from the insert to the keeper and anode was readily achieved through the relatively large orifices (0.18-0.4 cm diameter) tested with these cathodes. The observed discharge current increased in direct proportion to the external heater power until the discharge self-heating became significant.

Once the discharge has started, the heating of the insert is achieved by the discharge current flowing through the potential drop in the hollow cathode. Higher discharge currents tend to reduce the potential drop in the cathode, which was shown in FIG. 3F and calculated from a series of performance measurements on the $LaB_6$ cathode in the ion thruster simulator. See, Polk, J. E., Goebel, D. M., and Jameson, K. K., "Advanced Long-life Hollow Cathode Development at JPL," AIAA Paper 2006-5150, 2006. Study of embodiments of the present invention shows that the 0.8 cm $LaB_6$ cathode provided comparable performance as the NSTAR dispenser cathode in terms of the number of ions produced in the thruster when the discharge current exceeded about 10 A. Below this current, the discharge voltage and internal voltage drop in the $LaB_6$ cathode was observed to increase, which degrades the performance. In general, $LaB_6$ cathodes work as well in the plasma discharges provided that the current was sufficient to enable efficient self-heating.

Three example high-current hollow cathodes in accordance with embodiments of the present invention have been fabricated and tested for high power ion thruster and Hall thruster applications. The novel 1.5-cm LaB$_6$ cathode example demonstrates stable discharge currents up to 100 A. For applications that need discharge currents in the range of 10-60 A, the 0.8 cm cathode designed without a cathode orifice can run stably and appears to perform comparably to dispenser cathodes in terms of voltage drop and plasma generation. A 2-cm LaB$_6$ cathode was designed and run in test facilities at discharge currents up to 100 A, and discharge currents of up to 200 A appear possible with this cathode. The 2-cm cathode was also run successfully on a Hall thruster at discharge currents up to 40 A, and demonstrated low coupling voltages at the nominal flows in the thruster. See, Hofer, R. R., Johnson, L. K., Goebel, D. M., and Fitzgerald, D. J., "Effects of an Internally-Mounted Cathode on Hall Thruster Plume Properties," AIAA Paper 2006-4482, 2006. Operation at discharge currents below about 10 A may be problematic for the example sizes of LaB$_6$ cathodes shown here, although smaller cathodes may be fabricated to run at low current employing the principles described herein. The LaB$_6$ hollow cathode is very simple to operate, with no conditioning or activation procedures required, and has the promise of less sensitivity to the propellant gas impurity levels and long lifetimes.

5. Method of Emitting Electrons

Embodiments of the invention also encompass a method of emitting electrons consistent with the foregoing cathode apparatus. The method benefits from a cathode opening at least as large as the inner cross sectional area of the insert. In addition, employing a cathode having high aspect ratio geometry (i.e., length to width) improves heat retention at the insert to enhance electron emission.

Figure 4A:
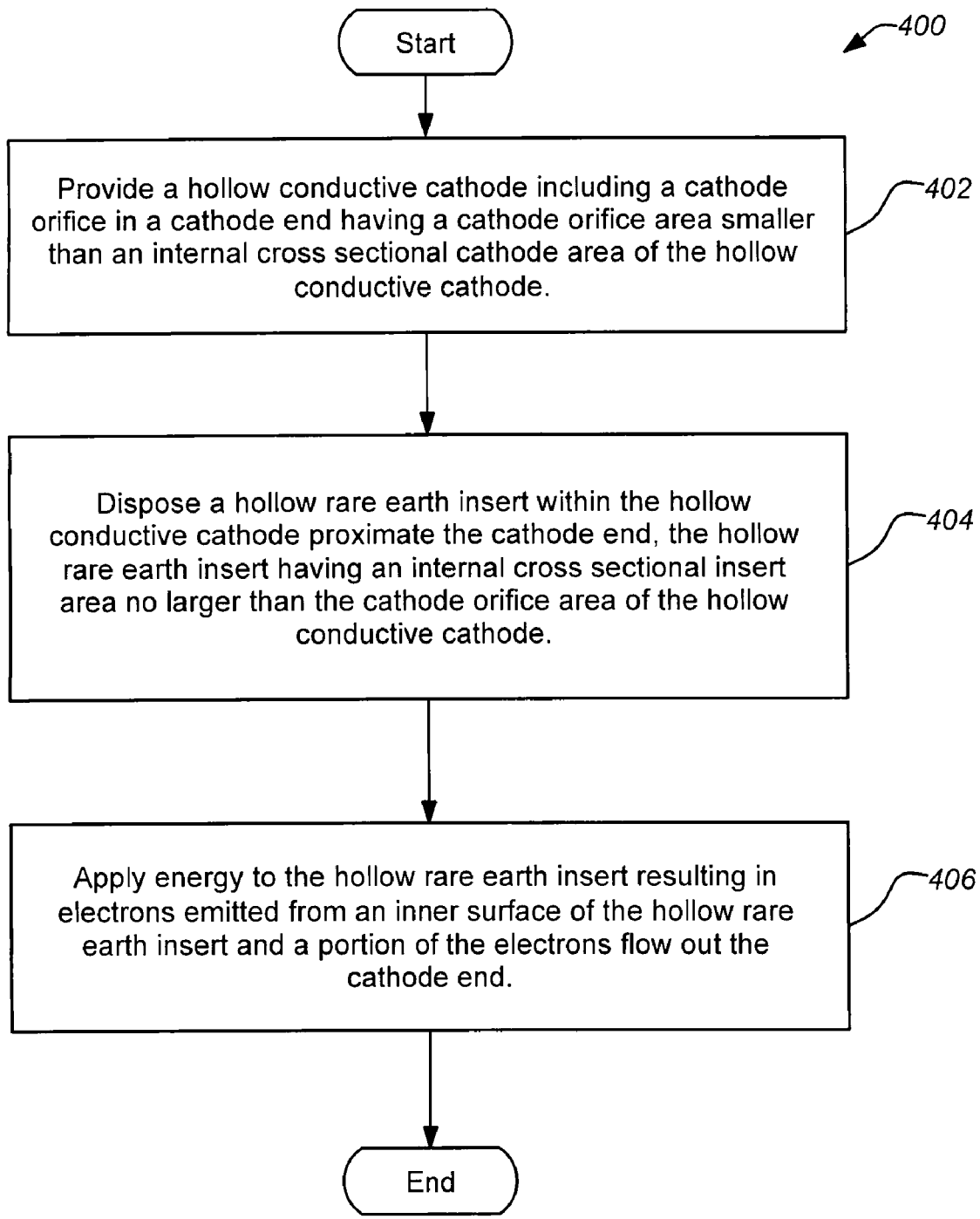
FIG. 4A is a flowchart of a method of emitting electrons according to the invention.
Figure 4B:
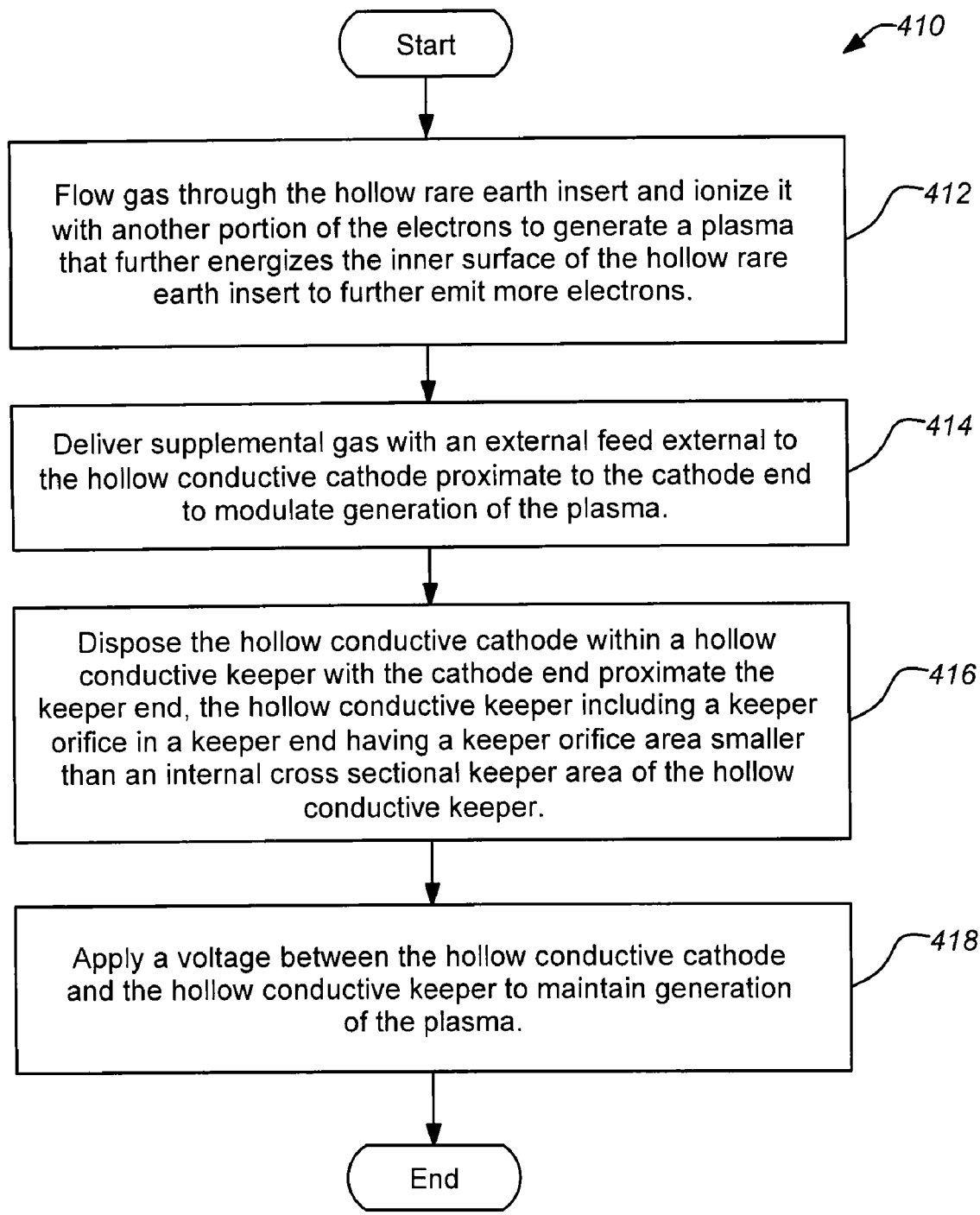
FIG. 4B is a flowchart of a sub-method of emitting electrons according to the invention.

FIG. 4 is a flowchart of an exemplary method 400 of emitting electrons. The method 400 begins with an operation 402 of providing a hollow conductive cathode including a cathode orifice in a cathode end having a cathode orifice area smaller than an internal cross sectional cathode area of the hollow conductive cathode. In operation 404, a hollow rare earth insert is disposed within the hollow conductive cathode proximate the cathode end, the hollow rare earth insert having an internal cross sectional insert area no larger than the cathode orifice area of the hollow conductive cathode. In operation 406, energy is applied to the hollow rare earth insert resulting in electrons emitted from an inner surface of the hollow rare earth insert and a portion of the electrons flow out the cathode end. The method 400 may be further enhanced through optional operations consistent with the apparatuses described in the foregoing sections. For example, in one optional operation heat transfer from the cathode end along the cathode length is reduced by the hollow conductive cathode may comprising a high aspect ratio geometry between a cathode length and a cathode width of the hollow conductive cathode.

In optional sub-method 410, processing involving plasma generation from a gas flow are implemented. In operation 412 gas is flowed through the hollow rare earth insert and ionized by another portion of the electrons to generate a plasma that further energizes the inner surface of the hollow rare earth insert to further emit more electrons. In operation 414, supplemental gas is delivered with an external feed external to the hollow conductive cathode proximate to the cathode end to modulate generation of the plasma. In operation 416, the hollow conductive cathode is disposed within a hollow conductive keeper with the cathode end proximate the keeper end, the hollow conductive keeper including a keeper orifice in a keeper end having a keeper orifice area smaller than an internal cross sectional keeper area of the hollow conductive keeper. In operation 418 a voltage is applied between the hollow conductive cathode and the hollow conductive keeper to maintain generation of the plasma.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An electron emitter, comprising:
   a hollow conductive cathode including a cathode orifice in a cathode end having a cathode orifice area smaller than an internal cross sectional cathode area of the hollow conductive cathode such that the cathode end is cupped slightly; and
   a hollow rare earth insert disposed within the hollow conductive cathode proximate the cathode end, the hollow rare earth insert having an internal cross sectional insert area no larger than the cathode orifice area of the hollow conductive cathode;
   wherein energy is applied to the hollow rare earth insert resulting in electrons emitted from an inner surface of the hollow rare earth insert and a portion of the electrons flow out the cathode end and the hollow rare earth insert is held in position against the cupped cathode end by a retainer and spring disposed behind the hollow rare earth insert.

2. The electron emitter of claim 1, wherein the internal cross sectional insert area is substantially identical to the cathode orifice area.

3. The electron emitter of claim 1, wherein the hollow conductive cathode comprises a high aspect ratio geometry between a cathode length and a cathode width of the hollow conductive cathode to reduce heat transfer from the cathode end along the cathode length and to allow central mounting in a Hall effect thruster.

4. The electron emitter of claim 1, wherein a gas flowing through the hollow rare earth insert is ionized by another portion of the electrons generating a plasma further energizing the inner surface of the hollow rare earth insert to further emit more electrons.

5. The electron emitter of claim 4, further comprising an external feed delivering supplemental gas external to the hollow conductive cathode proximate to the cathode end to modulate generation of the plasma.

6. The electron emitter of claim 4, further comprising a hollow conductive keeper including a keeper orifice in a keeper end having a keeper orifice area smaller than an internal cross sectional keeper area of the hollow conductive keeper;
   wherein the hollow conductive cathode is disposed within the hollow conductive keeper with the cathode end proximate the keeper end and a voltage is applied between the hollow conductive cathode and the hollow conductive keeper to maintain generation of the plasma.

7. The electron emitter of claim 6, wherein the keeper orifice is larger than the internal cross sectional insert area.

8. The electron emitter of claim 6, wherein the hollow conductive keeper comprises graphite, molybdenum, or tantalum.

9. The electron emitter of claim 6, further comprising an external feed delivering supplemental gas external to the hollow conductive keeper proximate to the keeper end to modulate generation of the plasma.

10. The electron emitter of claim 6, further comprising a keeper feed delivering supplemental gas in an annular passage between the hollow conductive cathode and the hollow conductive keeper to modulate generation of the plasma.

11. The electron emitter of claim 1, further comprising a heater disposed around the end of the hollow conductive cathode for heating the rare earth insert to initially energize the rare earth insert to emit the electrons.

12. The electron emitter of claim 1, wherein the hollow rare earth insert comprises lanthanum hexaboride ($LaB_6$).

13. A method of emitting electrons, comprising:
providing a hollow conductive cathode including a cathode orifice in a cathode end having a cathode orifice area smaller than an internal cross sectional cathode area of the hollow conductive cathode such that the cathode end is cupped slightly;
disposing a hollow rare earth insert within the hollow conductive cathode proximate the cathode end, the hollow rare earth insert having an internal cross sectional insert area no larger than the cathode orifice area of the hollow conductive cathode;
holding the hollow rare earth insert in position against the cupped cathode end by a retainer and spring disposed behind the hollow rare earth insert; and
applying energy to the hollow rare earth insert resulting in electrons emitted from an inner surface of the hollow rare earth insert and a portion of the electrons flow out the cathode end.

14. The method of claim 13, wherein the internal cross sectional insert area is substantially identical to the cathode orifice area.

15. The method of claim 13, wherein the hollow conductive cathode comprises a high aspect ratio geometry between a cathode length and a cathode width of the hollow conductive cathode to reduce heat transfer from the cathode end along the cathode length and to allow central mounting in a Hall effect thruster.

16. The method of claim 13, further comprising flowing a gas through the hollow rare earth insert and ionizing the gas by another portion of the electrons to generate a plasma that further energizes the inner surface of the hollow rare earth insert to further emit more electrons.

17. The method of claim 16, further comprising delivering supplemental gas with an external feed external to the hollow conductive cathode proximate to the cathode end to modulate generation of the plasma.

18. The method of claim 16, further comprising disposing the hollow conductive cathode within a hollow conductive keeper with the cathode end proximate the keeper end, the hollow conductive keeper including a keeper orifice in a keeper end having a keeper orifice area smaller than an internal cross sectional keeper area of the hollow conductive keeper; and
applying a voltage between the hollow conductive cathode and the hollow conductive keeper to maintain generation of the plasma.

19. The method of claim 18, wherein the keeper orifice is larger than the internal cross sectional insert area.

20. The method of claim 18, wherein the hollow conductive keeper comprises graphite, molybdenum, or tantalum.

21. The method of claim 18, further comprising delivering supplemental gas with an external feed external to the hollow conductive keeper proximate to the keeper end to modulate generation of the plasma.

22. The method of claim 18, further comprising delivering supplemental gas with a keeper feed in an annular passage between the hollow conductive cathode and the hollow conductive keeper to modulate generation of the plasma.

23. The method of claim 13, further comprising heating the rare earth insert with a heater disposed around the end of the hollow conductive cathode to initially energize the hollow rare earth insert to emit the electrons.

24. The method of claim 13, wherein the hollow rare earth insert comprises lanthanum hexaboride ($LaB_6$).

25. An electron emitter, comprising:
a hollow conductive cathode means for flowing a gas including an cathode orifice in a cathode end having a cathode orifice area smaller than an internal cross sectional cathode area of the hollow conductive cathode means such that the cathode end is cupped slightly; and
a hollow rare earth insert means for emitting electrons disposed within the hollow conductive cathode proximate the cathode end, the hollow rare earth insert means having an internal cross sectional insert area no larger than the cathode orifice area of the hollow conductive cathode means;
wherein the electrons emitted from the hollow rare earth insert ionize the gas flowing through the hollow rare earth insert to generate a plasma from the gas and the hollow rare earth insert means is held in position against the cupped cathode end by a retainer and spring disposed behind the hollow rare earth insert means.

26. The electron emitter of claim 25, wherein the hollow conductive cathode means comprises a high aspect ratio geometry between a cathode length and a cathode width of the hollow conductive cathode to reduce heat transfer from the cathode end along the cathode length and to allow central mounting in a Hall effect thruster.

* * * * *